United States Patent
Sahin et al.

(10) Patent No.: US 9,965,381 B1
(45) Date of Patent: *May 8, 2018

(54) INDENTIFYING DATA FOR PLACEMENT IN A STORAGE SYSTEM

(75) Inventors: Adnan Sahin, Needham, MA (US); Alexandr Veprinsky, Brookline, MA (US); Marik Marshak, Newton, MA (US); Hui Wang, Upton, MA (US); Xiaomei Liu, Natick, MA (US); Owen Martin, Hopedale, MA (US); Sean C. Dolan, Belmont, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 894 days.

This patent is subject to a terminal disclaimer.

(21) Appl. No.: 13/135,261

(22) Filed: Jun. 30, 2011

(51) Int. Cl.
*G06F 12/00* (2006.01)
*G06F 13/00* (2006.01)
*G06F 13/28* (2006.01)
*G06F 12/02* (2006.01)
*G06F 3/06* (2006.01)

(52) U.S. Cl.
CPC .......... *G06F 12/023* (2013.01); *G06F 3/0683* (2013.01)

(58) Field of Classification Search
CPC ............................. G06F 12/023; G06F 3/0683
USPC ................................................ 711/173, 170
See application file for complete search history.

(56) References Cited

U.S. PATENT DOCUMENTS

| | | | |
|---|---|---|---|
| 5,206,939 A | 4/1993 | Yanai et al. | |
| 5,727,167 A * | 3/1998 | Dwyer et al. | 710/100 |
| 5,778,394 A | 7/1998 | Galtzur et al. | |
| 5,845,147 A | 12/1998 | Vishlitzky et al. | |
| 5,857,208 A | 1/1999 | Ofek | |
| 6,324,139 B1 * | 11/2001 | Nakane | 369/47.52 |
| 6,324,620 B1 * | 11/2001 | Christenson et al. | 711/112 |
| 6,457,139 B1 * | 9/2002 | D'Errico | G06F 3/061 710/10 |
| 6,640,285 B1 * | 10/2003 | Bopardikar et al. | 711/133 |
| 6,721,870 B1 * | 4/2004 | Yochai et al. | 711/204 |
| 7,124,272 B1 * | 10/2006 | Kennedy et al. | 711/173 |
| 7,363,453 B1 * | 4/2008 | Arnan et al. | 711/170 |
| 7,822,939 B1 | 10/2010 | Veprinsky et al. | |
| 7,949,637 B1 * | 5/2011 | Burke | 707/655 |
| 7,958,329 B2 * | 6/2011 | Holt | 711/170 |
| 7,984,259 B1 * | 7/2011 | English | 711/165 |

(Continued)

OTHER PUBLICATIONS

U.S. Appl. No. 12/924,396, filed Sep. 27, 2010, Marshak et al.
U.S. Appl. No. 13/135,265, filed Jun. 30, 2011, Sahin et al.

*Primary Examiner* — Sheng-Jen Tsai
(74) *Attorney, Agent, or Firm* — Muirhead and Saturnelli, LLC

(57) ABSTRACT

Identifying data for placement in a storage system having a plurality of storage classes includes subdividing the data into portions, for each of the portions, independently determining at least one score for a particular portion based on a metric corresponding to access of the particular portion, where the at least one score for the particular portion is independent of scores for other ones of the portions, and identifying sub-portions of data for placement in a particular storage class based on the at least one score of a portion of data corresponding to the sub-portions. The at least one score may be based on short term access statistics and long term access statistics. The access statistics may include read misses, writes, and prefetches.

24 Claims, 25 Drawing Sheets

(56) References Cited

U.S. PATENT DOCUMENTS

| | | | |
|---|---|---|---|
| 8,473,680 B1* | 6/2013 | Pruthi | G06F 12/0811 711/118 |
| 8,555,018 B1* | 10/2013 | Rohr et al. | 711/165 |
| 8,583,838 B1* | 11/2013 | Marshak et al. | 710/18 |
| 8,909,887 B1* | 12/2014 | Armangau et al. | 711/165 |
| 2002/0178326 A1* | 11/2002 | Ohta et al. | 711/113 |
| 2006/0059474 A1* | 3/2006 | Bhansali et al. | 717/151 |
| 2006/0184718 A1* | 8/2006 | Sinclair et al. | 711/103 |
| 2008/0071939 A1* | 3/2008 | Tanaka et al. | 710/18 |
| 2008/0307158 A1* | 12/2008 | Sinclair | 711/103 |
| 2009/0150593 A1* | 6/2009 | Hamilton et al. | 711/101 |
| 2010/0281230 A1* | 11/2010 | Rabii | G06F 3/0605 711/165 |
| 2010/0306464 A1* | 12/2010 | Dawkins | G06F 3/0605 711/114 |
| 2011/0145473 A1* | 6/2011 | Maheshwari | 711/103 |
| 2011/0145646 A1* | 6/2011 | Harris et al. | 714/37 |
| 2011/0252210 A1* | 10/2011 | Davies | 711/165 |
| 2012/0221774 A1* | 8/2012 | Atkisson et al. | 711/103 |
| 2013/0024609 A1* | 1/2013 | Gorobets et al. | 711/103 |
| 2013/0238572 A1* | 9/2013 | Prahlad et al. | 707/692 |

\* cited by examiner

INDENTIFYING DATA FOR PLACEMENT IN A STORAGE SYSTEM

TECHNICAL FIELD

This application relates to computer storage devices and, more particularly, to the field of managing available resources provided on a computer storage device.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

An individual storage system may contain multiple tiers of storage, each of which may have different performance characteristics and operating costs. For example, one tier may be comprised of Flash drives, another of Fibre Channel drives and another of SATA drives. The character of the storage request access loads that these each drive type is best suited for may vary greatly. In order to efficiently exploit the different capabilities provided by these drive types, the drive type to which a each region of logical storage is mapped would be selected so that the resulting host access workload for the drives would effectively exploit that drives capabilities (e.g., SATA drives are effective at handling workloads with low access density and tolerance for higher response times, while Flash drives are effective at handling workloads with high access density and low response time requirements. Fibre Channel drives effective at handling workloads that do not fall into either of these extremes.

The use of a multi-tiered configuration can in principal be optimized to a greater degree when the size of the regions that optimal tier selection decisions are made for is smaller. However, the selection of a small region size for tier selection may result in the need to determine optimal placement for significant numbers (billions) of regions. Thus, it may be impractical to use techniques that completely analyze all of the data before identifying the candidates for promotion and demotion between the tiers. Such techniques do not necessarily scale well as amount of storage (and number of storage portions) increases. Also, such techniques may not react quickly enough to work load change due their sequential mode of operation.

Accordingly, it is desirable to be able to provide continuous data movement between the tiers in parallel (and possibly using multiple CPUs) while having minimal impact to the system as data is analyzed and moved between the tiers.

SUMMARY OF THE INVENTION

According to the system described herein, identifying data for placement in a storage system having a plurality of storage classes includes subdividing the data into portions, for each of the portions, independently determining at least one score for a particular portion based on a metric corresponding to access of the particular portion, where the at least one score for the particular portion is independent of scores for other ones of the portions, and identifying sub-portions of data for placement in a particular storage class based on the at least one score of a portion of data corresponding to the sub-portions. The at least one score may be based on short term access statistics and long term access statistics. The access statistics may include read misses, writes, and prefetches. Placement of data may include promotion of sub-portions of data to relatively faster storage classes and demotion of sub-portions of data to relatively slower storage classes, where a first score that emphasizes short term access statistics may be used for promotion and where a second score that emphasizes long term access statistics may be used for demotion. A sub-portion of data marked for promoting based on a score thereof may not be considered for demotion. There may be three storage classes of data, where a sub-portion of data marked for promoting to a fastest class of storage may not be considered for demotion and where a sub-portion of data marked for promoting to a second fastest class of storage may not be considered for demotion to a slowest class of storage. Placement of sub-portions of data may include promotion of sub-portions of data to relatively faster storage classes and demotion of sub-portions of data to relatively slower storage classes. The portions of data may be extents having five thousand seven hundred and sixty tracks of data. The sub-portions of data may be one or more data chunks of a corresponding portion and each of the data chunks may have one hundred and twenty tracks of data.

According further to the system described herein, computer software, provided in a non-transitory computer-readable medium, identifies data for placement in a storage system having a plurality of storage classes. The software includes executable code that independently determines at least one score for a particular portion of the data based on a metric corresponding to access of the particular portion, where the at least one score for the particular portion of the data is independent of scores for other portions of the data and executable code that identifies sub-portions of data for placement in a particular storage class based on the at least one score of a portion of data corresponding to the sub-portions. At least one score may be based on short term access statistics and long term access statistics. The access statistics may include read misses, writes, and prefetches. Executable code that places the data may include executable code that promotes sub-portions of data to relatively faster storage classes and demotes sub-portions of data to relatively slower storage classes and wherein a first score that emphasizes short term access statistics is used for promotion and wherein a second score that emphasizes long term access statistics is used for demotion. A sub-portion of data marked for promoting based on a score thereof may not be considered for demotion. There may be three storage classes of data, where a sub-portion of data marked for promoting to a fastest class of storage may not be considered for demotion and where sub-portion of data marked for promoting to a second fastest class of storage may not be considered for demotion to a slowest class of storage. Executable code that places sub-portions of data may include executable code that promotes sub-portions of data to relatively faster storage classes and demotes sub-portions of data to relatively slower storage classes. The portions of data may be extents having five thousand seven hundred and sixty tracks of data. The sub-portions of data may be one or more data chunks of a corresponding portion and each of the data chunks may have one hundred and twenty tracks of data.

According further to the system described herein, managing data in a storage system having a plurality of classes of storage includes determining an amount of data to be provided on at least one of the classes of storage according to a policy, dynamically setting a threshold according to the amount of data to be provided on the at least one of the classes or an expected performance based on the threshold, and placing data on particular classes of storage based on the threshold. Dynamically setting a threshold may include sorting data portions according to at least one score thereof and may include determining a particular score corresponding to the amount of data to be provided. The data portions may be provided in a histogram having a horizontal scale corresponding to a score value and a vertical scale corresponding to a number of data portions having a particular value. At least some of the scores may be logarithmic. The data portions may be extents having five thousand seven hundred and sixty tracks of data. Contiguous extents having scores that are the same may be combined into superextents. At least one score may be based on short term access statistics and long term access statistics and the access statistics may include read misses, writes, and prefetches. Placing data may include promotion of some of the data to relatively faster storage classes having a score above a first threshold and demotion of some of the data to relatively slower storage classes having a score below a second threshold. A data portion that is marked for promoting based on a score thereof may not be considered for demotion. There may be three storage classes of data and where data that is marked for promoting to a fastest class of storage may not be considered for demotion and where data that is marked for promoting to a second fastest class of storage may not be considered for demotion to a slowest class of storage.

According further to the system described herein, computer software, provided in a non-transitor computer-readable medium, manages data in a storage system having a plurality of classes of storage. The software includes executable code that determines an amount of data to be provided on at least one of the classes of storage according to a policy, executable code that dynamically sets a threshold according to the amount of data to be provided on the at least one of the classes or an expected performance based on the threshold, and executable code that places data on particular classes of storage based on the threshold. Executable code that dynamically sets a threshold may include executable code that sorts data portions according to at least one score thereof and may include executable code that determines a particular score corresponding to the amount of data to be provided. The data portions may be provided in a histogram having a horizontal scale corresponding to a score value and a vertical scale corresponding to a number of data portions having a particular value. At least some of the scores may be logarithmic. The data portions may be extents having five thousand seven hundred and sixty tracks of data. Contiguous extents having scores that are the same may be combined into superextents. At least one score may be based on short term access statistics and long term access statistics and the access statistics may include read misses, writes, and prefetches. Executable code that places data may include executable code that promotes some of the data to relatively faster storage classes having a score above a first threshold and demotes some of the data to relatively slower storage classes having a score below a second threshold. A data portion that is marked for promoting based on a score thereof may not be considered for demotion. There may be three storage classes of data where data that is marked for promoting to a fastest class of storage may not be considered for demotion and where data that is marked for promoting to a second fastest class of storage may not be considered for demotion to a slowest class of storage.

BRIEF DESCRIPTION OF THE DRAWINGS

Embodiments of the system are described with reference to the several figures of the drawings, described as follows.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1A:
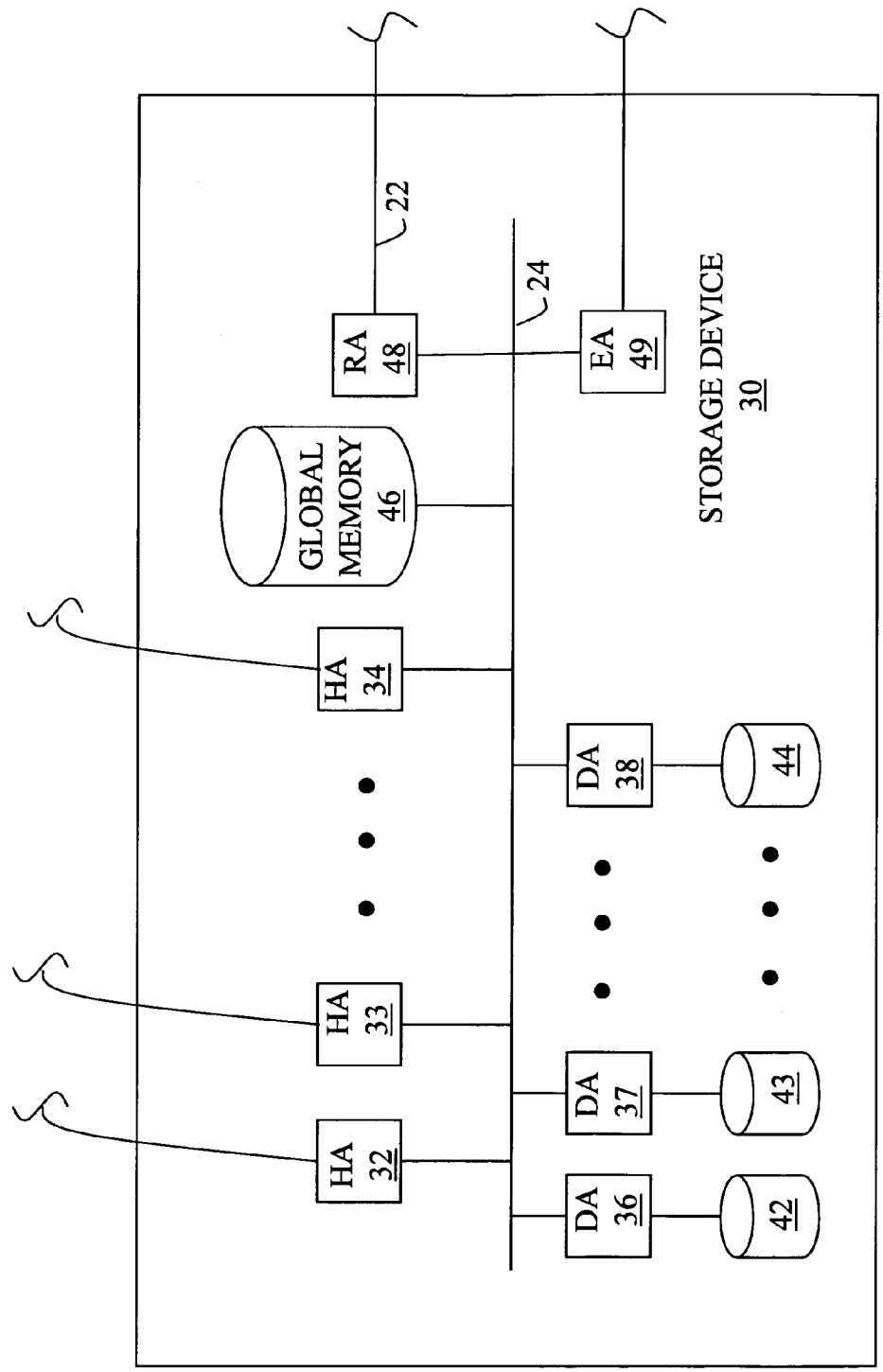
FIG. 1A is a schematic diagram showing a plurality of hosts and a data storage device in connection with an embodiment of the system described herein.

FIG. 1A is a schematic illustration showing a storage device 30 that includes a plurality of host adapters (HA) 32-34, a plurality of disk adapters (DA) 36-38 and a plurality of disk drives 42-44. The disk drives 42-44 should be understood as representing any appropriate type of storage media, including, without limitation, DRAM cache, flash or other solid-state storage device, tape, optical media, and/or any combination of permanent, semi-permanent and temporarily-limited storage media. Each of the disk drives 42-44 is coupled to a corresponding one of the DA's 36-38. Although FIG. 1A shows a one-for-one correspondence between the DA's 36-38 and the disk drives 36-38, it should be understood that it is possible to couple more than one disk drive to a DA and/or to couple more than one DA to a disk drive. The storage device 30 also includes a global memory 46 that may be accessed by the HA's 32-34 and the DA's 36-38. The storage device 30 also includes an RDF (Remote Data Facility) adapter (RA) 48 that may also access the global memory 46. The RA 48 may communicate with one or more additional remote storage devices and/or one or more other remote devices via a data link 22. The storage device also includes an external storage adaptor (EA) 49 that may be used to communicate with one or more other storage devices that could either be the same type of storage device as the storage device 30 or could be a different type of storage device. The HA's 32-34, the DA's 36-38, the global memory 46, the RA 48 and the EA 49 may be coupled to a bus 24 that is provided to facilitate communication therebetween. In various embodiments, additional RA's and/or EA's may be incorporated into the storage device 30.

Figure 1B:
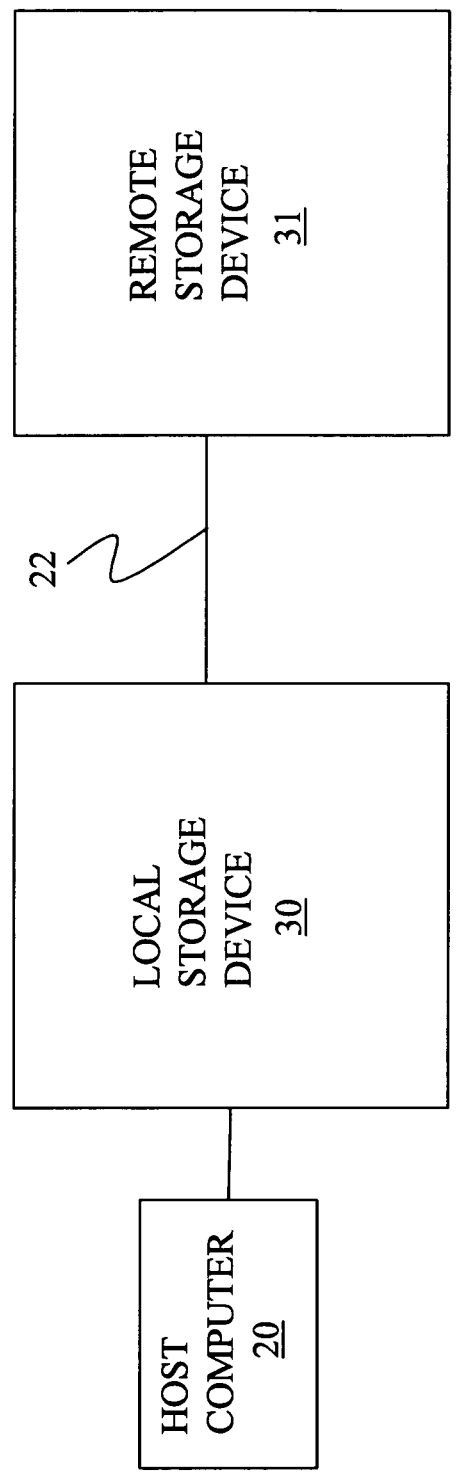
FIG. 1B is a schematic diagram showing a local storage device coupled to a remote storage device via a data link.

FIG. 1B is a schematic diagram showing the storage device 30, as a local storage device, coupled to a remote storage device 31 via the data link 22. The remote storage device 31 may be the same type of storage device as the storage device 30 and/or may be a different type of storage device. The local storage device 30 and the remote storage device 31 may operate as an RDF product for providing backup and/or mirrored copies of data, as further discussed elsewhere herein.

Each of the HA's 32-34 of the storage device 30 may be coupled to one or more host computers 20 that access the storage device 30. The host computers (hosts) access data on the disk drives 42-44 through the HA's 32-34 and the DA's 36-38. The global memory 46 contains a cache memory that holds tracks of data read from and/or to be written to the disk drives 42-44 as well as storage for tables that may be accessed by the HA's 32-34, the DA's 36-38, the RA 48, and the EA 49. Note that, for the discussion herein, blocks of data are described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries.

Figure 2:
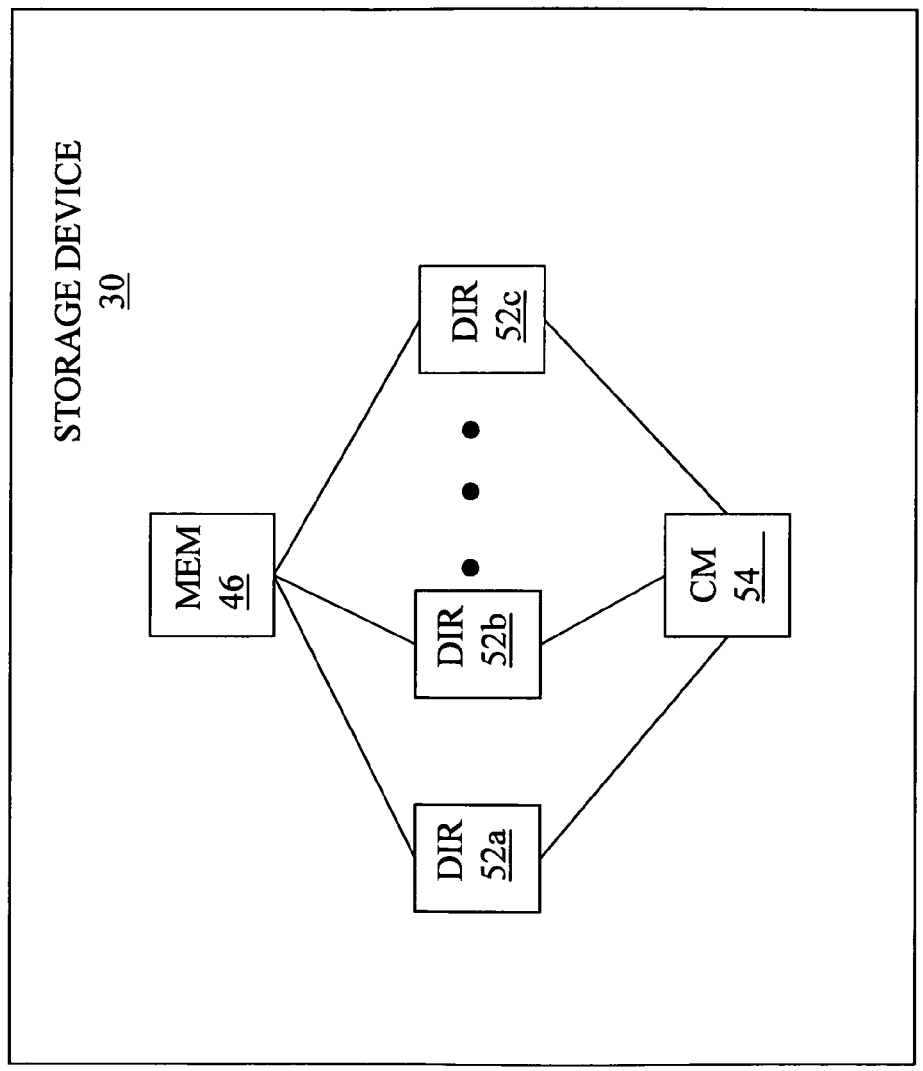
FIG. 2 is a schematic diagram showing a storage device, memory, a plurality of directors, and a communication module in connection with an embodiment of the system described herein.

FIG. 2 is schematic diagram showing an embodiment of the storage device 30 where each of a plurality of directors 52a-52c are coupled to the memory 46. Each of the directors 52a-52c may represent one or more of the HA's 32-34, the DA's 36-38, the RA 48 and/or the EA 49. In an embodiment disclosed herein, there may be up to sixty-four directors coupled to the memory 46. Of course, for other embodiments, there may be a higher or lower maximum number of directors that may be used.

FIG. 2 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 46. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of different types of director and perform other processing with the other processing system. Generally, the system described herein could work with any appropriate hardware configuration, including configurations where at least some of the memory 46 is distributed among at least some of the directors 52a-52c and in configurations where a number of core processors are coupled to a generic interface card.

The storage devices 30, 31 may be provided as stand-alone devices coupled to the host 20 as shown in FIG. 1B or, alternatively, the storage devices 30, 31 may be part of a storage area network (SAN) that includes a plurality of other storage devices as well as routers, network connections, etc. The storage devices may be coupled to a SAN fabric and/or be part of a SAN fabric. The system described herein may be implemented using software, hardware, and/or a combination of software and hardware where software may be stored in a computer readable medium and executed by one or more processors.

The system described herein is suitable for use with the technique of thin provisioning. Thin provisioning allows for the creation of logical volumes of storage space where allocation of physical storage space occurs only when space is actually needed (e.g., when data is written in the first time to the storage space). Logical storage space may be identified to a user as being available even though no physical storage space has been committed, at least initially. When data is written to the logical storage space, physical storage space is drawn for use from a pool of physical storage space, as further described elsewhere herein. In addition, as described in more detail elsewhere herein, stored data may be moved between physical locations using the storage infrastructure described herein.

Figure 3:
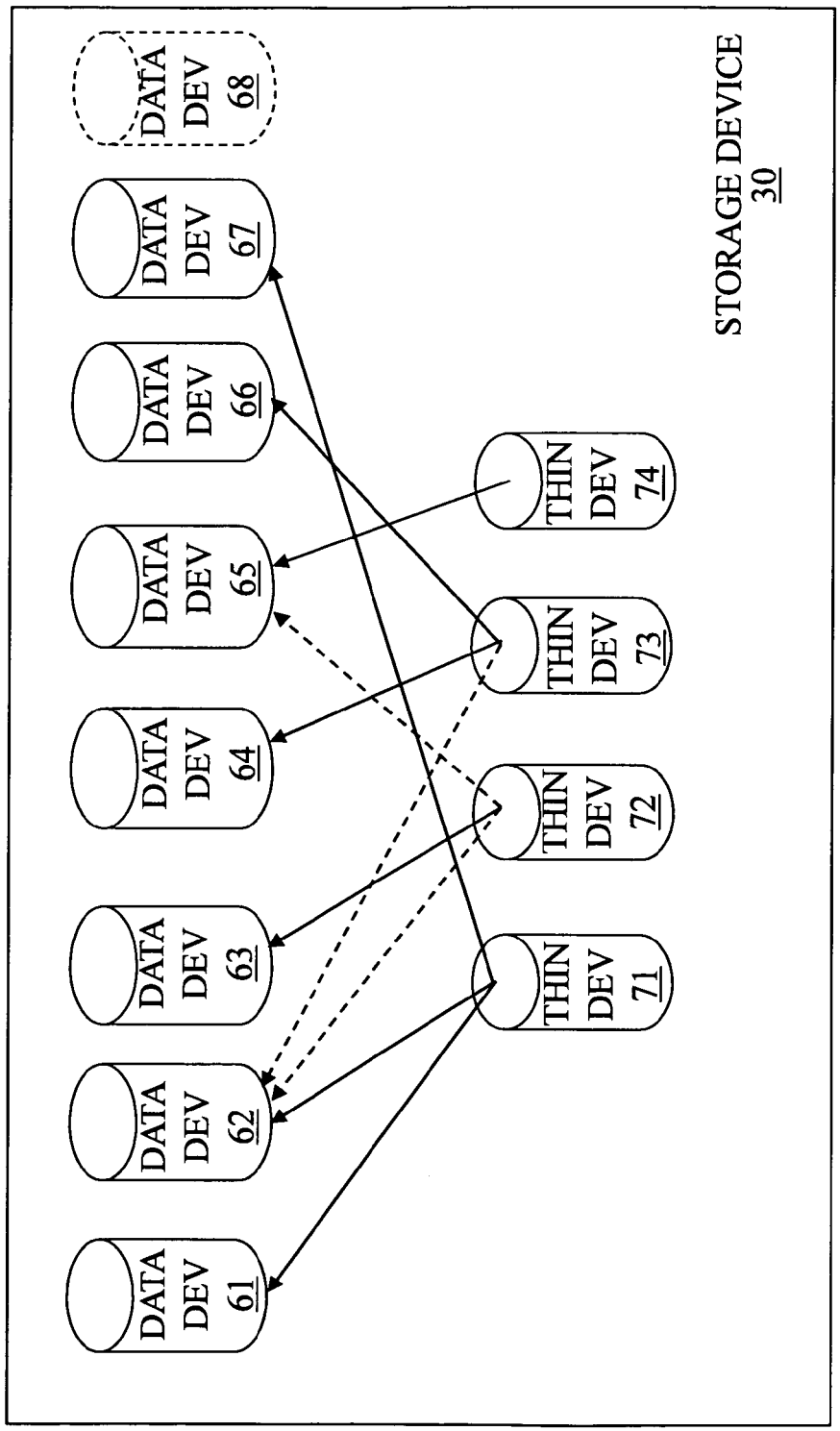
FIG. 3 is a schematic diagram showing a storage device including thin devices and data devices in connection with an embodiment of the system described herein.

FIG. 3 is a schematic diagram showing the storage device 30 as including a plurality of data devices 61-68. Data devices 61-67 may be implemented as logical devices like standard logical devices provided in a Symmetrix data storage device. In some embodiments, the data devices 61-67 may not be directly useable (visible) to hosts coupled to the storage device 30. Each of the data devices 61-67 may correspond to a portion (including a whole portion) of one or more of the disk drives 42-44. Thus, for example, the data device 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. The data device 68 is illustrated with broken lines to indicate that the data device 68 does not yet exist but may be created, as further discussed elsewhere herein.

The storage device 30 may also include one or more thin devices 71-74. Each of the thin devices 71-74 may appear to a host coupled to the storage device 30 as a logical volume (logical device) containing a contiguous block of data storage. Each of the thin devices 71-74 may contain tables that point to some or all of the data devices 61-67 (or portions thereof), as further discussed elsewhere herein. In some instances, the thin devices 71-74 may be concatenated to form a metavolume of thin devices. In some embodiments, only one thin device may be associated with the same data device while, in other embodiments, multiple thin devices may be associated with the same data device, as illustrated in the figure with arrows having broken lines.

In some embodiments, it may be possible to implement the system described herein using storage areas, instead of storage devices. Thus, for example, the thin devices 71-74 may be thin storage areas, the data devices 61-67 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

Figure 4A:
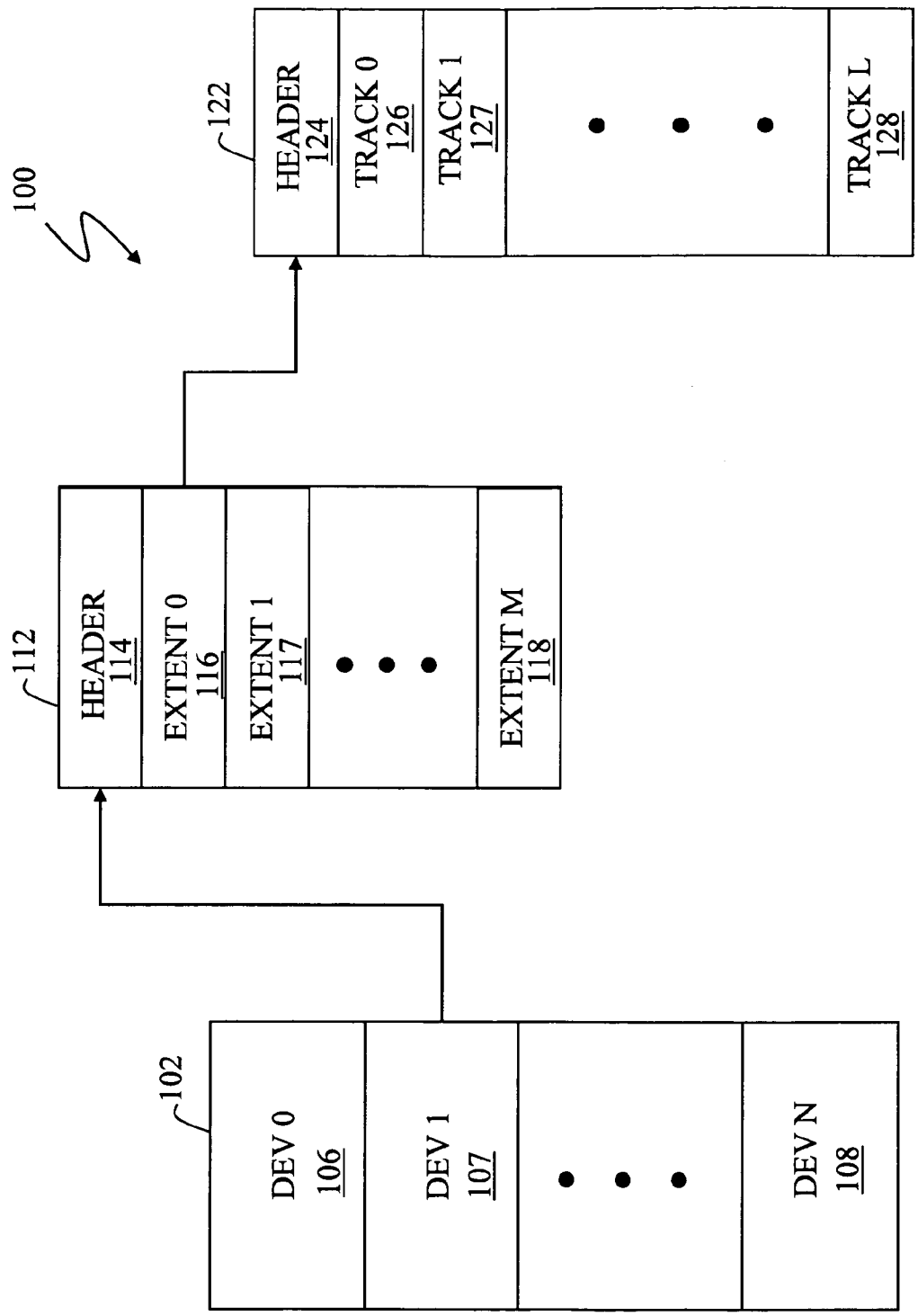
FIG. 4A is a schematic diagram illustrating tables that are used to keep track of device information in connection with an embodiment of the system described herein.

FIG. 4A is a diagram 100 illustrating tables that are used to keep track of device storage mapping information. A first table 102 corresponds to all of the devices used by a storage device or by an element of a storage device, such as an HA and/or a DA. The table 102 includes a plurality of logical device (logical volume) entries 106-108 that correspond to all the logical devices used by the storage device (or portion of the storage device). The entries in the table 102 may include information for thin devices, for data devices, for standard logical devices, for virtual devices, for BCV devices, and/or any or all other types of logical devices used in connection with the system described herein.

Each of the entries 106-108 of the table 102 may correspond to another table that may contain information for one or more logical volumes, such as thin device logical volumes. For example, the entry 107 may correspond to a thin device table 112. The thin device table 112 may include a header 114 that contains overhead information, such as information identifying the corresponding thin device, information concerning the last used data device and/or other information including counter information, such as a counter that keeps track of used group entries (described below). The header information, or portions thereof, may be available globally to the storage device 30.

The thin device table 112 may include one or more chunks 116-118 that contain information corresponding to a group of tracks on the data device or some other collection of data. The chunk may include one or more tracks, the number of which may be configured as appropriate, and/or may include a different increment of data. In an embodiment herein, each chunk corresponds to twelve tracks, although this number may be configurable or dynamically adjustable based on appropriate criteria. Each track may be 64 k bytes. Note that, for the same logical device, different ones of the extents may have different sizes.

One chunks 116-118 (for example, the chunk 116) of the thin device table 112 may identify a particular one of the data devices 61-67 (or a portion thereof) having a track table 122 that contains further information, such as a header 124 having overhead information and a plurality of entries 126-128, each corresponding to one of the tracks of the particular one of the data devices 61-67. The information in each of the entries 126-128 may include a pointer (either direct or indirect) to the physical address on one of the disk drives 42-44 of the storage device 30 (or a remote storage device if the system is so configured) that maps to the logical address(es) of the particular one of the data devices 61-67. Thus, the track table 122 may be used in connection with mapping logical addresses of the logical devices corresponding to the tables 102, 112, 122 to physical addresses on the disk drives 42-44 of the storage device 30.

The tables 102, 112, 122 may be stored in the global memory 46 of the storage device 30. In addition, the tables corresponding to particular logical devices accessed by a particular host may be stored (cached) in local memory of the corresponding one of the HA's 32-36. In addition, the RA 48 and/or the DA's 36-38 may also use and locally store (cache) portions of the tables 102, 112, 122.

Figure 4B:
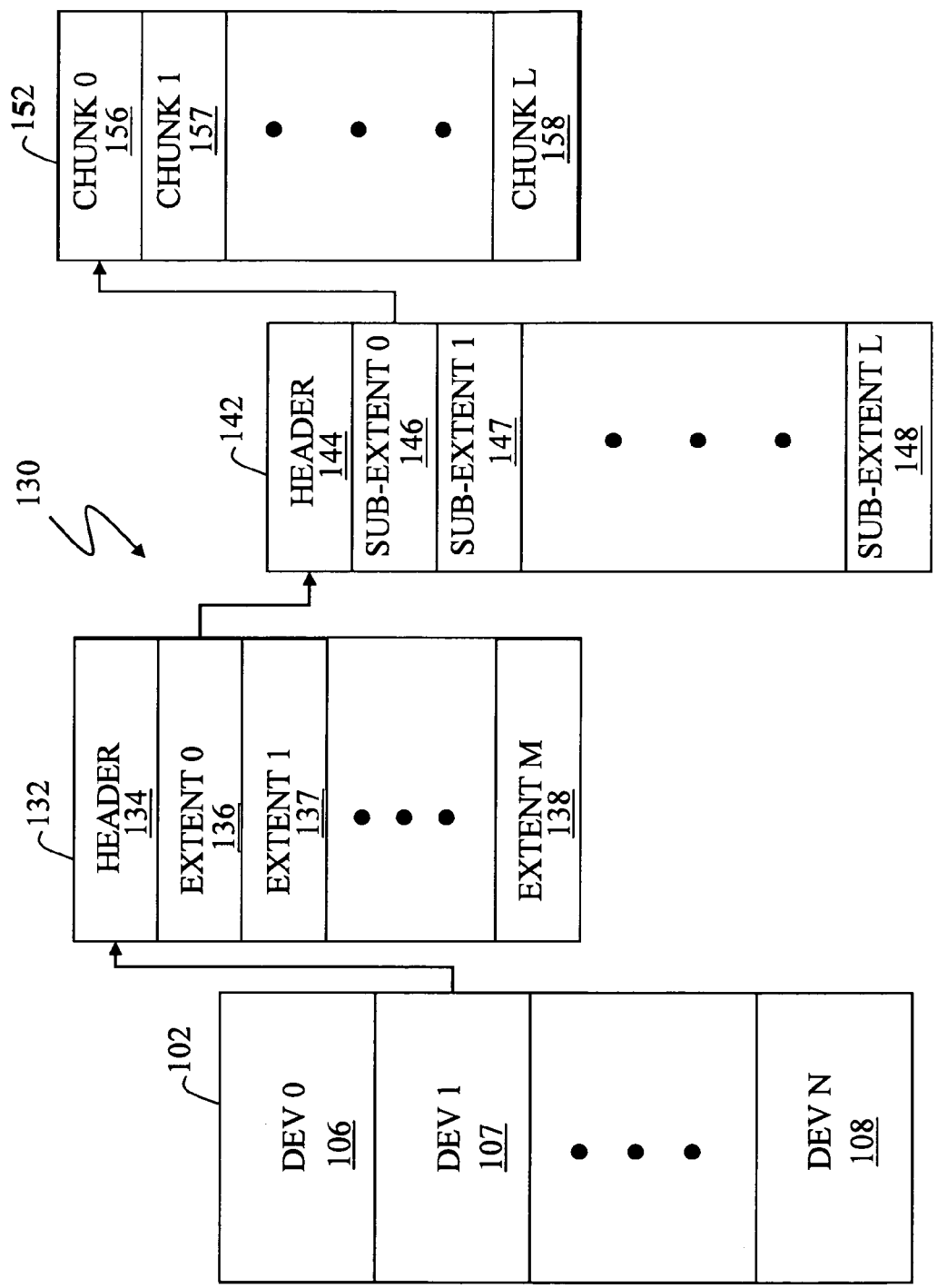
FIG. 4B is a schematic diagram illustrating tables that are used to keep track of access metrics according to an embodiment of the system described herein.

FIG. 4B is a schematic diagram illustrating tables that are used to keep track of access metrics for each contiguous portion, or extent, of a thin device. Each of the device entries 106-108 points to a table containing a header 134 and extent entries 136-138. Each of the extent entries 136-138 points to a table containing a header 144 and a plurality of sub-extent entries 146-148. Each of the sub-extent entries 146-148 points to a table containing a plurality of chunk entries 156-158.

For each extent of storage, the storage system maintains access statistics including, for example, short and long term rates at which random read misses, pre-fetches and writes are occurring. In some embodiments, the size of the extent used for access monitoring may be significantly larger than a chunk, and may be changed dynamically. An extent may in turn be organized into a set of contiguous sub-extents, which are themselves comprised of a contiguous range of chunks. For each sub-extent, the storage system may maintain a smaller amount of access information, that may be combined with information from the extent level to determine access statistics specific to a particular sub-extent. In some cases, the chunks may be organized into sub-extents of ten chunks each and the sub-extents may be organized into extents, each of which contains forty eight sub-extents.

Figure 5:
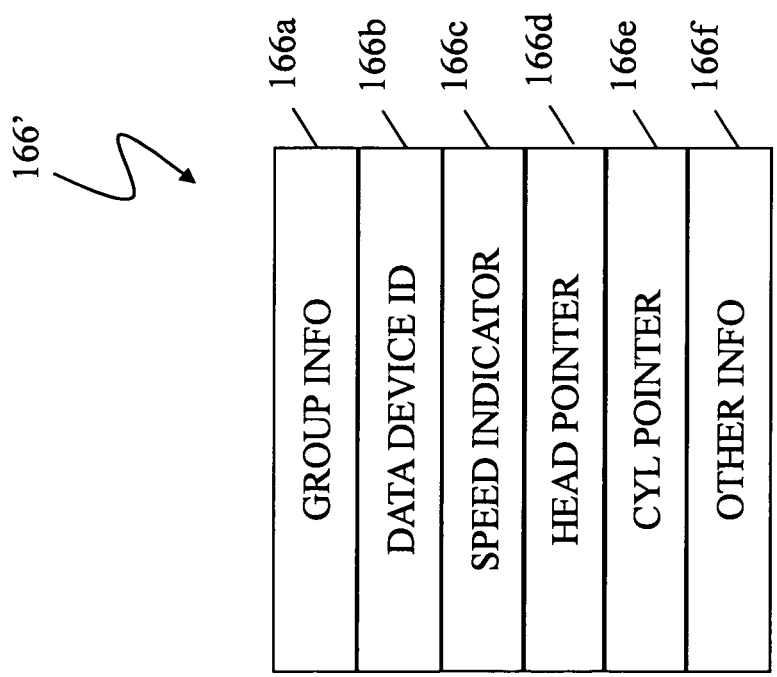
FIG. 5 is a schematic diagram showing a group element of a thin device table in connection with an embodiment of the system described herein.

FIG. 5 is a schematic diagram illustrating a chunk table 166' of the thin device table 112 in connection with an embodiment of the system described herein. The chunk table 166' may include a plurality of entries 166a-166f for the corresponding chunk 116. The entry 166a may provide information, such as a type that indicates whether there has been physical address space allocated for the chunk 116. The entry 166b may include information identifying one (or more) of the data devices 61-67 that correspond to the chunk 116 (i.e., the one of the data devices 61-67 that contains pointers for physical data for the chunk 116). The entry 166c may include other identifying information for the one of the data devices 61-67, including a speed indicator that identifies, for example, if the data device is associated with a relatively fast access physical storage (e.g., solid state memory) or a relatively slow access physical storage (e.g., rotating disk drive). Other types of designations of data devices are possible (e.g., relatively expensive or inexpensive, RAID protection type, numbered of mirrored copies, etc.).

The entry 166d may be a pointer to a head of the first allocated track for the one of the data devices 61-67 indicated by the data device ID entry 166b. Alternatively, the entry 166d may point to header information of the data device track table 122 immediately prior to the first allocated track. The entry 166e may identify a cylinder of a first allocated track for the one the data devices 61-67 indicated by the data device ID entry 166b. The entry 166f may contain other information corresponding to the chunk 116 and/or the corresponding thin device. As described in more detail elsewhere herein, the entry 166f may contain information corresponding to usage data (both measured and derived) that may be used to promote and/or demote data.

In some embodiments, entries of the chunk table 166' may identify a range of cylinders of the thin device and a corresponding mapping to map cylinder/track identifiers for the thin device to tracks/cylinders of a corresponding data device. In an embodiment, the size of the chunk table 166' may be eight bytes or may be made larger with additional information, as described elsewhere herein.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives 42-44. Thus, an access of the logical storage space of the thin device results in either a null pointer (or equivalent) indicating that no corresponding physical storage space has yet been allocated, or results in a reference to a data device which in turn references the underlying physical storage space.

Figure 6:
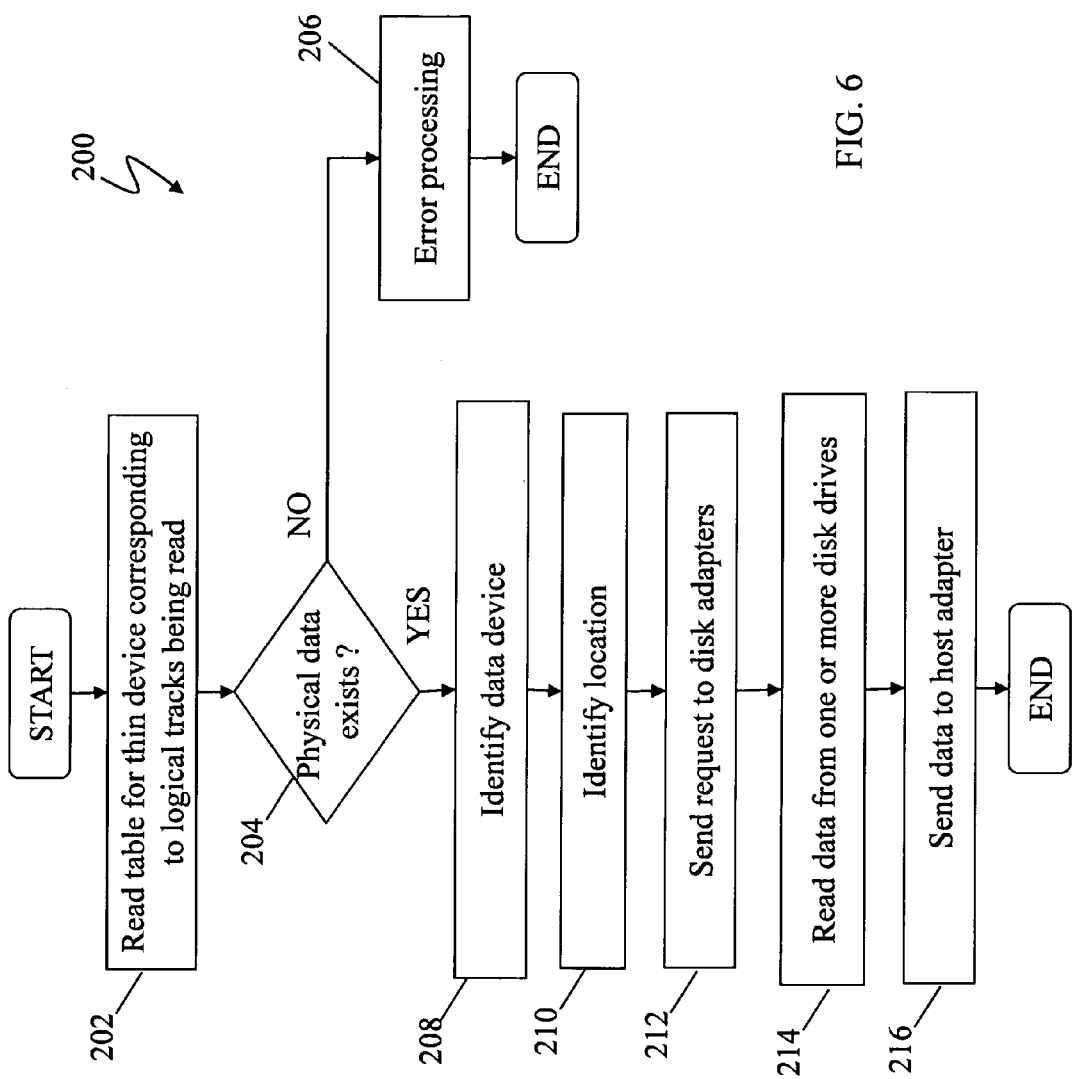
FIG. 6 is a flow chart illustrating processing for handling a read of one or more logical tracks of a thin device in connection with an embodiment of the system described herein.

FIG. 6 is a flow chart 200 illustrating processing for handling a read of one or more logical tracks of one of the thin devices 71-74 in an embodiment of the system described herein. In a step 202, an appropriate one of the host adapters 32-34 reads the group table 112 of the one of the thin devices 71-74 corresponding to the logical tracks being read. After the step 202, at a test step 204, it is determined whether the logical tracks identified from the group table 112 corresponds to any of the data devices 61-67 (i.e., if there is physical data corresponding to the logical tracks being read). If there is no corresponding physical data (meaning that no logical track(s) were ever written), then processing proceeds to a step 206 where error processing is performed, such as returning a NULL value to the host. Other appropriate error processing may be performed at the step 206. After the step 206, processing is complete.

If it is determined at the step 204 that there is physical data corresponding to the logical tracks being read, then processing proceeds to a step 208 where one or more of the data devices 61-67 associated with the logical tracks being read are identified from the group table 112. After the step 208, processing proceeds to a step 210 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space maps to space on the data devices.

After the step 210, processing proceeds to a step 212 where a request may be sent to one or more disk adapters 36-38 corresponding to disk drives 42-44 that provide the physical storage space associated with the identified one of the data devices 61-67 and corresponding location information. After the step 212, processing proceeds to a step 214 where the physical data is read. Note that the data may be stored in a cache or other memory (for example, the memory 46) in connection with being read. In some cases, if the data being read is already in the cache, then the processing at the step 212 and following steps may not be necessary. Note also that reading the data may include updating any metadata used to provide the processing described herein, such as the time last accessed, the host/user making the request, frequency of use, and/or any other appropriate metric. After the step 214, processing proceeds to a step 216 where the data may be received by an appropriate one of the host adapters 32-34 (e.g., by reading the memory 46). After the step 216, processing is complete.

Figure 7:
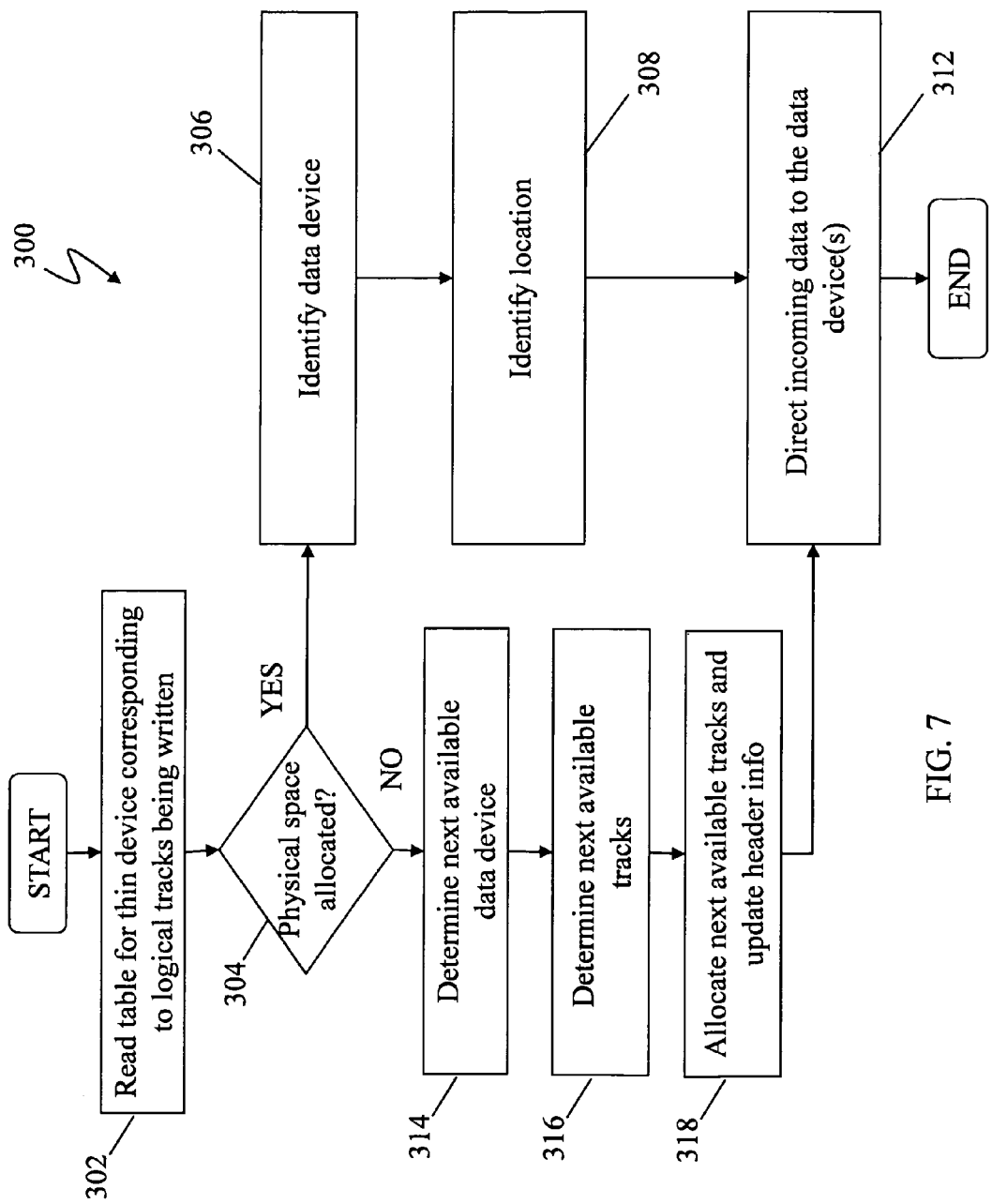
FIG. 7 is a flow chart illustrating processing for handling a write of one or more logical tracks to the thin device in connection with an embodiment of the system described herein.

FIG. 7 is a flow chart 300 illustrating processing for handling a write of logical track(s) to one or more of the thin device(s) 71-74 in connection with the system described herein. At a step 302, an appropriate one of the host adapters 32-34 reads the group table 112 of the one of the thin device(s) 71-74 corresponding to the logical tracks being written.

Following the step 302 is a test step 304 where it is determined whether physical space had been previously allocated (i.e., in a prior write operation) for the logical tracks being written. If so, then processing proceeds to a step 306 where the data device that includes the logical tracks is identified. After the step 306, is a step 308 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space maps to space on the data devices. Following the step 308 processing proceeds to a step 312 where the data being written is directed to the appropriate physical storage space. The incoming data overwrites the appropriate portion of the data where directed. After the step 312, processing is complete.

If it is determined at the step 304 that there is no physical storage that has been allocated for the logical track(s) being written, then control transfers from the step 304 to a step 314, where a next available data device identifier (i.e., the data device 68) is determined. This information may be obtained from the header 114 of the device table 112. In an embodiment herein, data device identifiers are provided by numbers so that a next available data device identifier is simply one more than a last allocated data device. However, as discussed in more detail elsewhere herein, selection of a data device at the step 314 may include application of other criteria.

After the step 314, processing proceeds to a step 316 where available physical storage space on the disk drives 42-44 is determined. In an embodiment herein, available physical storage space is allocated sequentially from one or more of the disk drives 42-44. Following the step 316 is a step 318 where a request may be sent to a disk adapter 36-38 (or possibly the RA 48 and/or the EA 49) to allocate the physical storage space for the write. Also at the step 318, header info is updated to reflect the newly allocated data device and physical tracks. After the step 318, processing proceeds to the step 312, discussed above, where the data being written is directed to the one or more data devices. After the step 312, processing is complete.

After the read and write processes illustrated in FIGS. 6 and 7, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 112 (for example, the entry 166f of the group element 166' as shown in FIG. 5). Alternatively, the data characteristic information may be stored in a memory, such as the global memory 46 of the storage device 30, and a pointer to this information stored in the group element 166'. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be allocated for a thin storage device (provisioned storage space) even though the corresponding physical storage space had not yet been allocated. In an alternative embodiment, the policy for the thin device may be to report something less than the total maximum that could be allocated. In some embodiments, used physical storage space may not exceed 30% of the provisioned storage space.

In an embodiment herein, different portions of the physical data may be automatically moved between different physical disk drives or other storage devices (different tiers) with the same or different characteristics according to one or more policies. For example, data may be initially allocated to a particular fast disk drive, (relatively high tier) but a portion of the data that has not been used over a period of time (for example, three weeks) may be automatically moved, according to the system described herein, to a slower (and perhaps less expensive) disk drive (relatively lower tier). The physical data may then be automatically moved back to the higher tier if the data is subsequently used and/or accessed according to a policy or other criteria (for example, accessed twice in any given week), as further described herein. Thus, the system described herein may operate to automatically move data between tiers within the same machine according to the one or more policies.

A policy may be configured by an administrator on a system-wide level or may be specific to a particular user on a specific logical device. The system described herein allows for the remapping of physical data based on policy criteria or other statistics. For example, the policy may be based on the last time data was used and/or accessed. Alternatively, the policy may be based on anticipated use of data over specific times and/or dates. For example, data that is expected to be used at a particular time may be stored on (or relocated to) relatively fast tier and then moved to relatively slow tier when it is expected that the data will not be used again for a lengthy period of time. Moreover, different policies and/or criteria may be implemented corresponding to different users and/or different levels of importance or security of data. For example, it may be known that user A accesses particular data more frequently than user B and, accordingly, the policy for moving physical data according to the system described herein may be to leave more data associated with user A on the relatively fast disk drive as compared with the data associated with user B. Alternatively, user A may access data that is generally of a higher level of importance or requires higher security than that of user B and, accordingly, the system described herein may maintain and/or move more data associated with user A on a disk drive that is relatively more reliable, available and/or secure as compared with the data associated with user B.

In an embodiment herein, data may be moved between physical disk drives (or other physical storage) having different characteristics, such as speed, cost, reliability, availability, security and/or other characteristics. As discussed elsewhere herein, logical data devices may be established having different classes corresponding to characteristics of the physical disk drives (or other physical storage) to which the data devices are mapped. Further, it should be noted that any section of the logical device may be moved according to the system described herein based on the characteristics of the data (and governed by default or specific policies).

Figure 8:
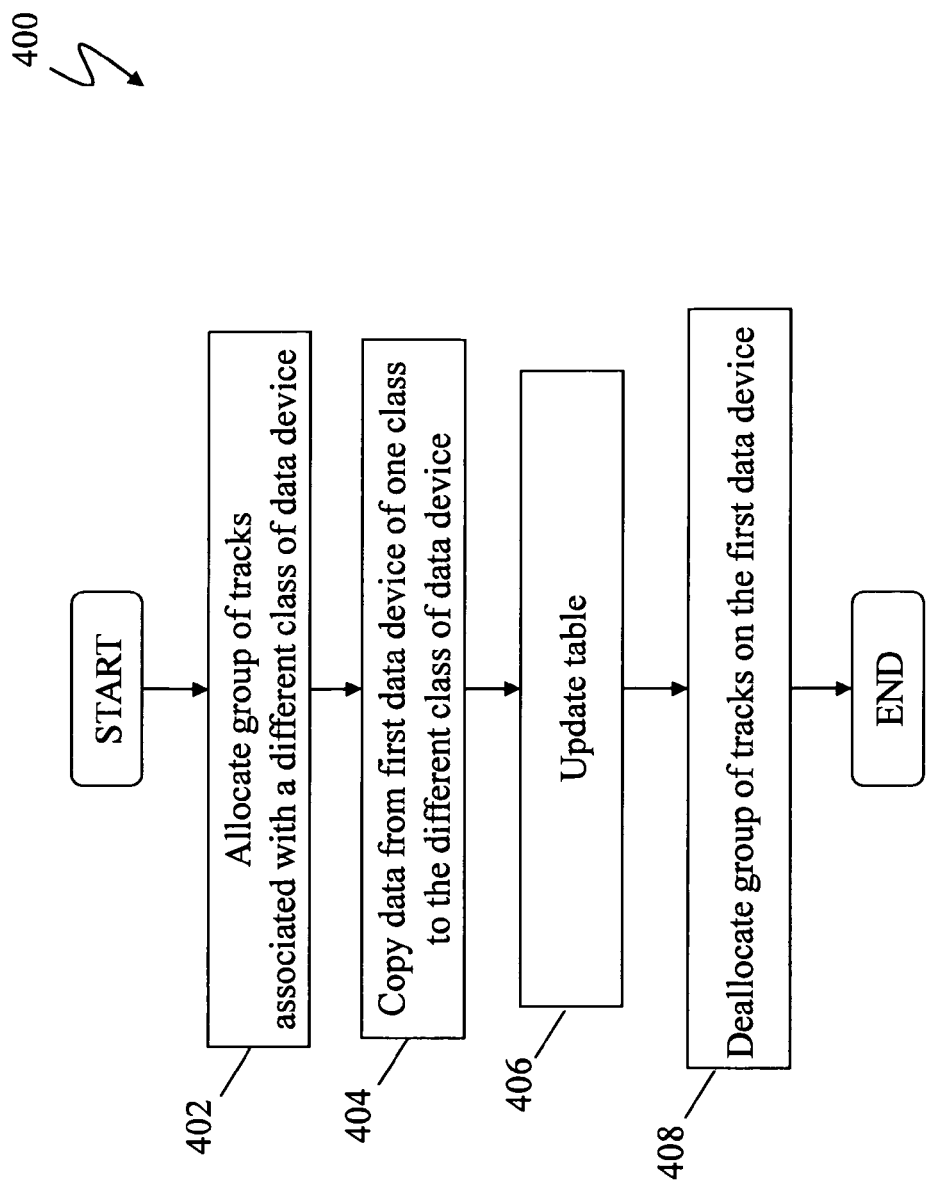
FIG. 8 is a flow chart illustrating processing for copying and remapping physical data within a storage device in connection with an embodiment of the system described herein.

FIG. 8 is a flow chart 400 illustrating processing for copying and remapping physical data according to the system described herein. In a step 402, space for a group of tracks is allocated on a second data device having a different class from that of a first data device (data source). The first data device has a first storage class that is different from a second storage class of the second data device. For example, the second data device may be mapped to a physical disk drive that is slower than that of the first data device of the first class, as further discussed elsewhere herein. After the step 402, processing proceeds to a step 404 where data associated with the data device of the first class is copied to a location corresponding to the data device of the second class. After the step 404, processing proceeds to a step 406 where the group table of the thin device is updated in accordance with the remapping. After the step 406, processing proceeds to a step 408 where the group of tracks associated with the data device of the first class, from which the data was copied, is deallocated, freeing the locations for future use.

Figure 9:
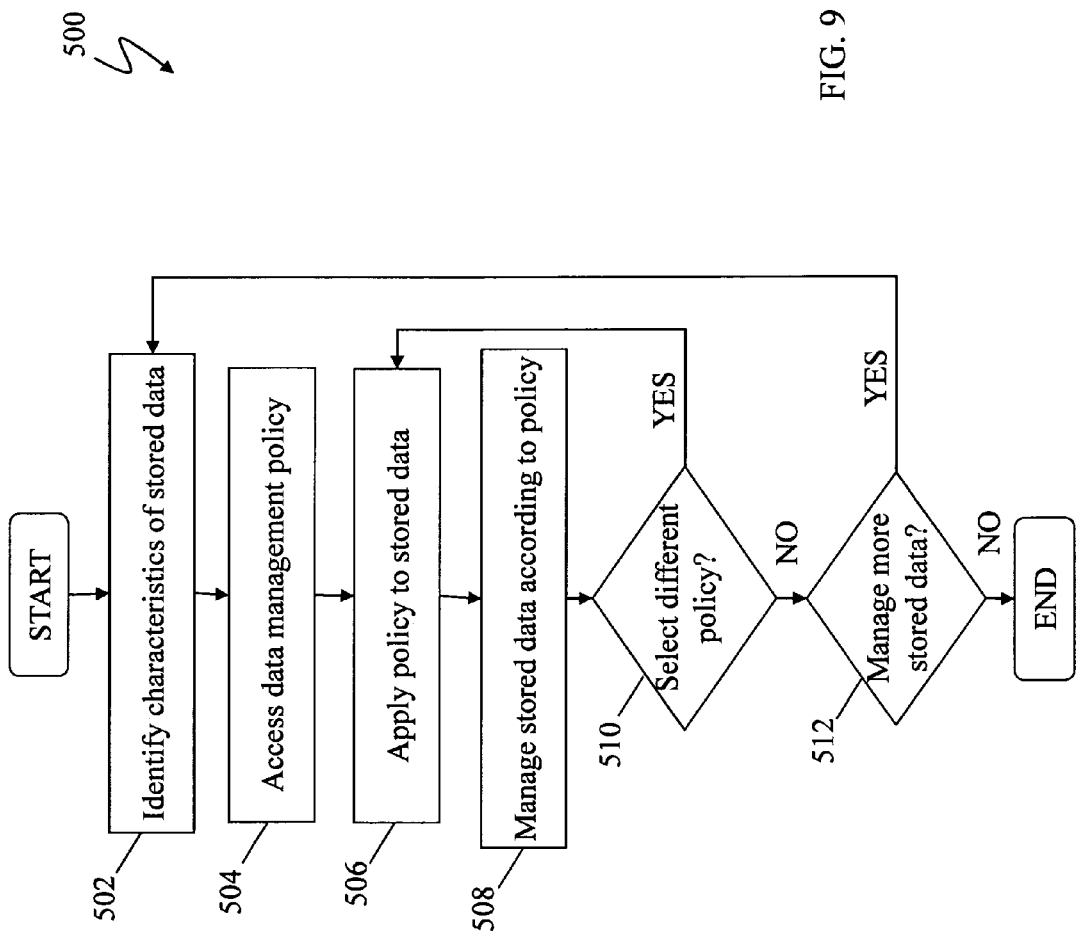
FIG. 9 is a flow chart illustrating implementation of a policy to data storage and management in connection with an embodiment of the system described herein.

FIG. 9 is a flow chart 500 illustrating implementation of a policy for data storage and management in connection with an embodiment of the system described herein. In a step 502, certain characteristics of stored data are identified (for example, from the group element 166', as discussed elsewhere herein). In various embodiments, the characteristics may include usage information such as when the stored data was last accessed and/or how often the stored data has been accessed over a specific time period (for example, hours, days, weeks, etc.). It is also possible to determine how long (on average or in aggregate) it has taken to service each specific I/O request to the data. As further discussed elsewhere herein, the characteristics may also include particular user information corresponding to the stored data.

After the step 502, processing proceeds to a step 504 where policy information is accessed. The policy information provides the specific criteria used for data storage and management. After the step 504, processing proceeds to a step 506 where the policy is applied to the stored data. The policy may include criteria used for managing stored data such as criteria concerning frequency of use of data and/or criteria with respect to specific users and/or other criteria, such as file name, file type, file path, requesting application, expected time to re-use of the data, temporary storage only, life expectancy of the data, data type (e.g., compressed, encrypted, de-duped) and/or protection requirements of the data (e.g., store on an encrypted tier). The policy may be applied to identify data for lifecycle management according to characteristics of entire data volumes or any portions thereof. The policy may also consider the access history, effective performance or other characteristics about the data that might be utilized to optimize the performance, cost, availability or retention requirements of the data.

After the step 506, processing proceeds to a step 508 where the data for which characteristics have been determined is managed according to the policy and based on the characteristics of the data. For example, data that is frequently used may be moved to a relatively fast storage device whereas data that has not been used over a certain period of time may be moved to a relatively slow storage device according to the data processing as discussed elsewhere herein. As noted herein, the data that is moved may be entire data volumes or portions thereof. As discussed elsewhere herein, it may be possible to provide fairly sophisticated analysis to determine whether to promote data (move to a relatively faster storage device) or demote data (move to a relatively slower storage device).

After the step 508, processing proceeds to a test step 510 where it is determined if another policy with other criteria should be applied to the stored data being managed. If an additional policy is to be applied, then processing proceeds to the step 506. If no further policies are to be applied, then processing proceeds to a test step 512 where it is determined whether there is more data to be managed according to the system described herein. If there is further stored data to manage, then processing proceeds back to the step 502. If no further stored data is to be managed, then after the test step 512, processing is complete. In some cases, tracking, avoiding and resolving conflicting priorities would be handled to ensure that two policies do not create a "ping-pong" effect, moving data blocks up- and down- in a never ending cycle.

As discussed elsewhere herein, the data devices 61-67 may be associated with physical storage areas (e.g., disk drives, tape, solid state storage, etc.) having different characteristics. In various embodiments, the physical storage areas may include multiple tiers of storage in which each tier of storage areas and/or disk drives that may be ordered according to different characteristics and/or classes, such as speed, technology and/or cost. The thin devices 71-74 may appear to a host coupled to the storage device 30 as a logical volume (logical device) containing a contiguous block of data storage, as discussed herein. Each thin device 71-74 may correspond to a particular data device, a portion thereof and/or multiple data devices. Accordingly, each thin device 71-74 may map to storage areas across multiple storage tiers. As a result, although each thin device 71-74 may appear as containing a logically contiguous block of storage, each thin device 71-74 may allow for blocks of data to be transparently stored (and/or retrieved) from discontiguous storage pools made up of the varying classes of data storage devices. In this way, the granularity at which the system for tiered storage described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage tiers or different sized data blocks within a single storage tier.

Figure 10:
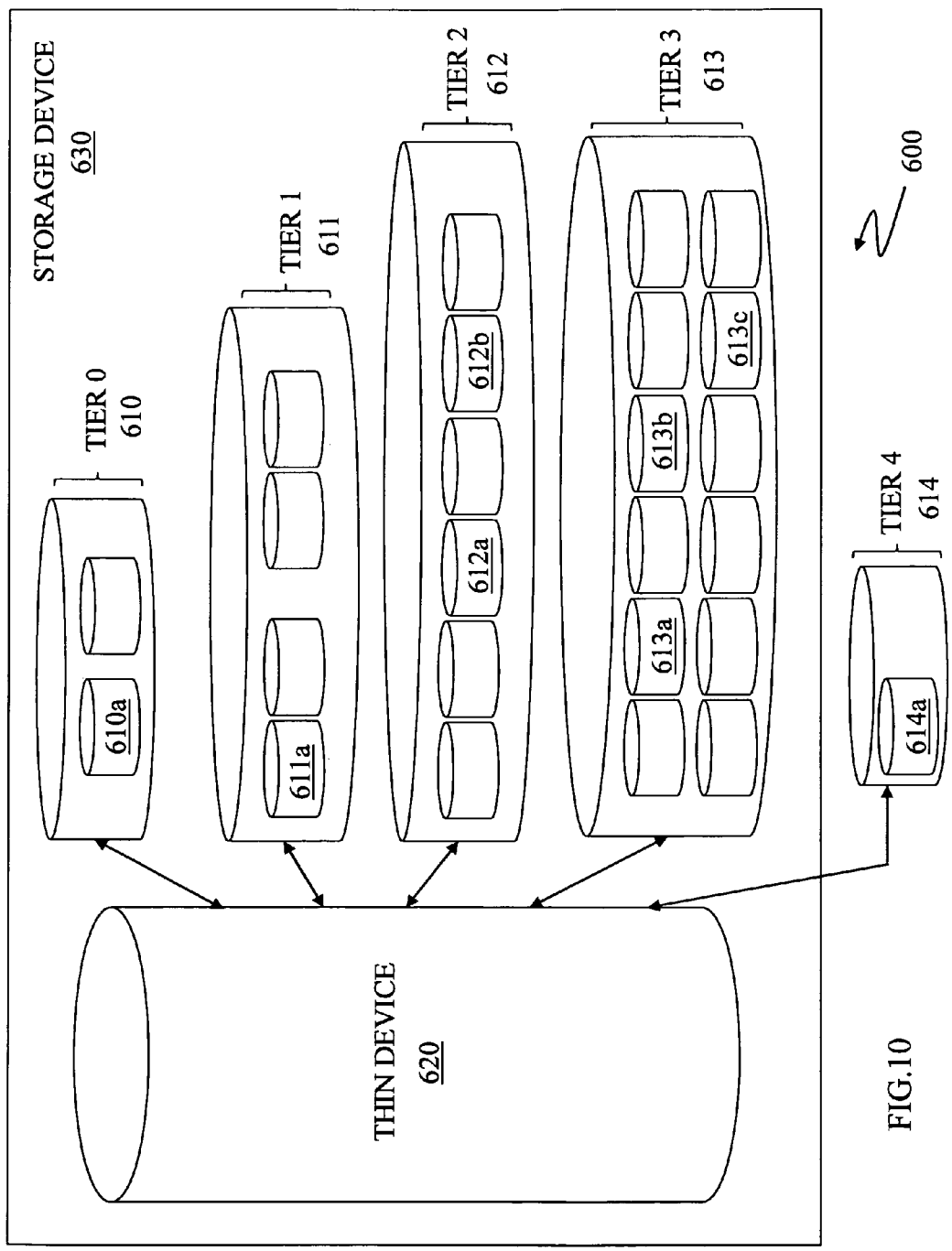
FIG. 10 is a schematic illustration of a fine grained tiered storage system according to an embodiment of the system described herein.

FIG. 10 is a schematic illustration of a fine grained tiered storage system 600 according to an embodiment of the system described herein. A storage device 630 is shown including a thin device 620, like the thin devices 71-74 discussed elsewhere herein, that may be coupled to multiple physical storage devices across multiple storage tiers. As discussed elsewhere herein, the storage tiers may be associated with data devices, like the data devices 61-67 discussed herein, so that, for example, there is one data device for each storage tier, one data device for multiple storage tiers, any portion of a data device for any portion of the pools of storage shown for the storage tiers, and/or any combinations thereof. For example, in an embodiment, a top tier storage pool 610 (e.g., tier 0) may include flash/solid state disk (SSD) drives that are relatively fast and expensive. Other storage pools 611-613 (e.g., tiers 1-3) may include disk drives of decreasing speeds or other configurations (i.e., 15 k rpm, 10 k rpm, 7.5 k rpm redundant array of independent disk (RAID) storage). The lowest tier of storage pool 614 (e.g., tier 4) may include, for example, tape storage, largest capacity disk drives (such as massive array of idle disks (MAID) storage). As illustrated, the last storage tier 614 may include storage devices external to the storage device 630 that may be suitable for long term storage of data that is infrequently accessed. However, note that external storage could have specific characteristics such as tape, or might perform additional processing to optimize the storage of data, such as de-duplication. In some embodiments, external storage might be used to support tier 2 or tier 3 class applications.

The thin device 620 may map to different storage areas (devices) across multiple tiers. As discussed elsewhere herein, the granularity of the system may be less than at the file level and allow for blocks of data of any size to be stored across multiple storage tiers 610-613 of the storage device 630 in a process that is transparent to the host and/or host application. For example, in the illustrated embodiment, the thin device 620 may map blocks of data to storage areas (devices) such as a storage area 610a in the pool of storage of the top storage tier 610, a storage area 611a in the pool of storage of the next storage tier 611, storage areas 612a, 612b in pool of storage of the next storage tier 612, and storage areas 613a, 613b, 613c in the pool of storage of the next storage tier 613. As discussed elsewhere herein, the last storage tier 614 may include external storage and the system described herein may map to a storage area 614a in the pool of storage in the tier 614.

Mirroring (backup) of data may also be facilitated by tiered storage across multiple tiers according to the system described herein. For example, data that is accessed frequently may be stored on a fast storage device (tier 0) while a mirrored copy of the data that is not expected to be accessed may be stored on a slower storage device in one or more other tiers (e.g., tiers 1-4). Accordingly, the same data may be stored on storage devices of multiple tiers of storage pools.

Figure 11:
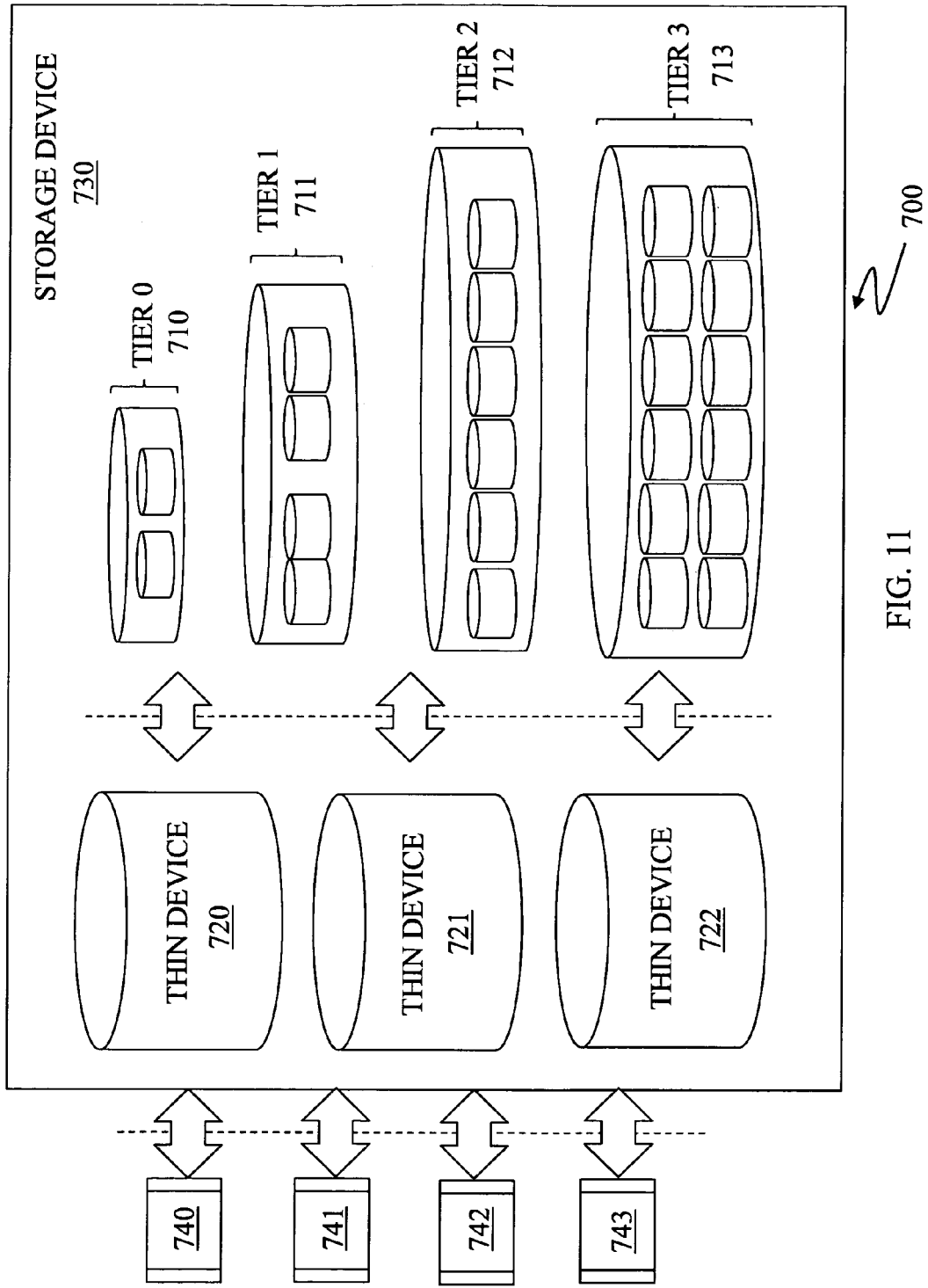
FIG. 11 is a schematic illustration showing a fine grained tiered storage system according to an embodiment of the system described herein.

FIG. 11 is a schematic illustration showing a fine grained tiered storage system 700 according to an embodiment of the system described herein. As illustrated, a storage device 730 includes multiple thin devices 720-722 and multiple pools of storage in multiple storage tiers 710-713. Host applications 740-744 and/or other entities (e.g., other storage devices, SAN switches, etc.) request data writes and data reads to and from the storage device 730. In various embodiments, multiple host applications 740-744 may share a single one of thin devices 720-722 and/or multiple thin devices 720-722 may be mapped to the same set of storage pools 710-713.

In an embodiment herein, a write target policy may be applied to data that is being written according to the system described herein. For example, data that is expected to be used frequently, for example database indices, may be initially written directly to fast storage (e.g., tier 0 flash/SSD storage) whereas data that is not expected to be accessed frequently, for example backup or archived data, may be initially written to slower storage devices (e.g., tier 4 MAID or external storage). In this manner, data is efficiently stored by targeting the write to storage areas and devices according to the estimated or expected access frequency of the data, beginning with the initial write of the data and also applying to subsequent data writes that jump across multiple tiers.

The process for determining the appropriate target storage location of the write of the data may be made based on the logical unit number (LUN) ID of the device from which the data is being written, where the storage device 730 may have or obtain information about the types of data stored on specific logical units. Alternatively, additional policies and capabilities may be enabled by adding host-resident "extension" software, for example to tag I/O requests with information about the requesting application or user so that the determination may be made based on other information provided by the host and/or entity accessing the storage device 730 (e.g., a target policy indicator provided with each write or class of writes). Other possible criteria include the time of day, the size of the incoming write operation (e.g. very large sequential writes vs. smaller random writes), file name, file type, host OS type, data type, access patterns, inter-dependent accesses to other data, etc. It is also possible that "hints" from the host could also be used, particularly relating to performance and availability requirements of the data, etc.

The system described herein may include autonomic promotion and demotion policies to facilitate optimization of performance, storage availability and power. For example, a least recently used (LRU) policy may be used to demote data blocks in order to pro-actively make room for new writes of data blocks and/or promotions of data blocks within the system. A most frequently used (MRU) policy may be used to promote data blocks that are frequently used to faster storage tiers. Predictive policies may be used to recognize that data blocks that will be needed before they are actually needed and promote the data blocks accordingly (for example, nightly batch jobs, etc.). Alternatively, the system described herein may include an application programming interface (API) that allows a hosts/users/applications to inform the storage that certain blocks should be promoted or demoted to different tiers. Note that promotion and demotion may relate to a relative ordering of tiers where promotion refers to moving data to physical storage that is relatively faster and demotion refers to moving data to physical storage that is relatively slower.

Other special purpose policies may also be used. As discussed elsewhere herein, mirroring of data blocks across multiple tiers may be used. For example, for frequently used data blocks, one copy may be written to flash/SSD memory at a top storage tier and a second copy mirrored to another storage tier (e.g., tier 3 or tier 4). Another policy may include promoting and/or demoting a data block, but not deleting the data block from its pre-promoted or demoted location until the data block is modified. This policy offers advantages including when subsequently demoting the block (if unmodified), a copy may already exist on a slower storage tier and an additional copy does not need to be made (only the copy on the faster storage tier deleted). When a data block is modified, the previous copy on a different storage tier may be deleted.

Other policies may include manual or automatic pre-promotion and post-demotion policies. For example, blocks may be promoted in the background immediately before batch runs (e.g., billing runs etc.). Additionally, writes for such processes as back-ups may required the fastest possible write, but never (or only infrequently) read. In this case, writes may be written to a top storage tier and immediately scheduled for demotion to a lower storage tier. With MAID storage, data blocks that are rarely or never used may be consolidated onto individual spindles that may then be powered off, providing a reduction in power consumption for storage of data blocks infrequently accessed. Further, sequential/contiguous blocks may be coalesced and relocated in an optimization process that may include other advanced strategies, including aligning indices near to data being indexed. It is also possible to have a de-duplication policy in which nothing is deleted from storage in a de-dup tier. Data blocks in storage pools of a de-dup storage tier may be promoted to fast storage tiers as needed, but block and index/metadata in the de-dup storage may be maintained even if a data block is promoted to a faster storage tier and modified or deleted. Maintenance of de-dup storage tiers may involve "use counters" and/or other mechanisms that may be used with known data cleaning processes such as garbage collection, etc.

In an embodiment herein, one or more policies may be provided to guarantee a particular level of performance and/or that a particular percentage of data is to be provided on storage having certain characteristics (e.g., speed). The policy may guarantee a minimum number for I/Os per second (IOPS) and/or may guarantee greater than a minimum IOPS for any I/O operation.

Figure 12:
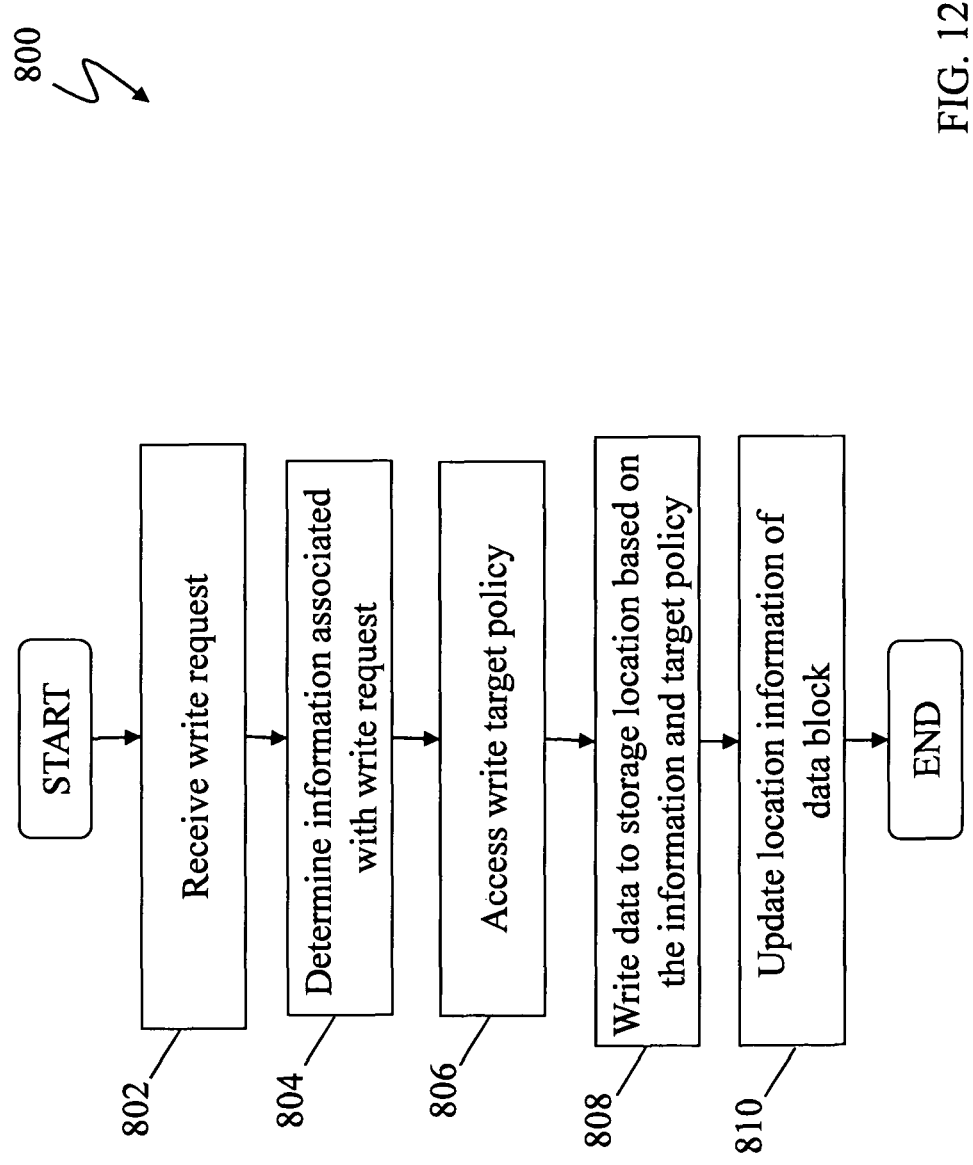
FIG. 12 is a flow chart of processes for writing data blocks in a fine grained tiered storage system based on one or more policies according to an embodiment of the system described herein.

FIG. 12 is a flow chart 800 of processes for writing data blocks in a fine grained tiered storage system based on one or more policies according to an embodiment of the system described herein. At a step 802, a request for a write of data is received by a thin device or other logical device associated with a storage device, as described herein. After the step 802, processing proceeds to a step 804 where information associated with the data block is determined. For example, as further discussed elsewhere herein, the information may be the logical unit number (LUN) ID of the device from which the data is being written and/or may other information provided by the host and/or other entity accessing the storage device. After the step 804, processing proceeds to a step 806 where a write target policy is accessed. For example, as further discussed elsewhere herein, the write target policy may specify that data that is expected to be used frequently may be initially written directly to faster storage in a first storage tier whereas data that is not expected to be accessed frequently may be initially written to slower storage devices in a lower storage tier.

After the step 806, processing proceeds to a step 808 where the determined information associated with the data is processed according to the target policy and the data block is written to a storage location in the storage device according thereto. Accordingly, the data block may initially be written to a storage area (device) in a pool of storage of a storage tier corresponding to the anticipated frequency of use of the data block and/or according to other criteria. After the step 808, processing proceeds to a step 810 where information concerning the location of the data block is updated in a table of information in the thin device, as further discussed elsewhere herein. After the step 810, processing is complete.

In some cases, there may be insufficient available free space to write data to the storage tier corresponding to the storage policy at the step 808. This may be addressed in a number of ways. One possibility is to maintain the data in cache memory until space becomes available, which can occur when data is moved from the target tier as a result deletion of promotion/demotion based on storage policies. Note also that it is possible to temporarily store the data in a lower tier, and then schedule the data for promotion to the appropriate tier using any appropriate mechanism, such as setting a flag that causes the data to be promoted before any other data.

Figure 13:
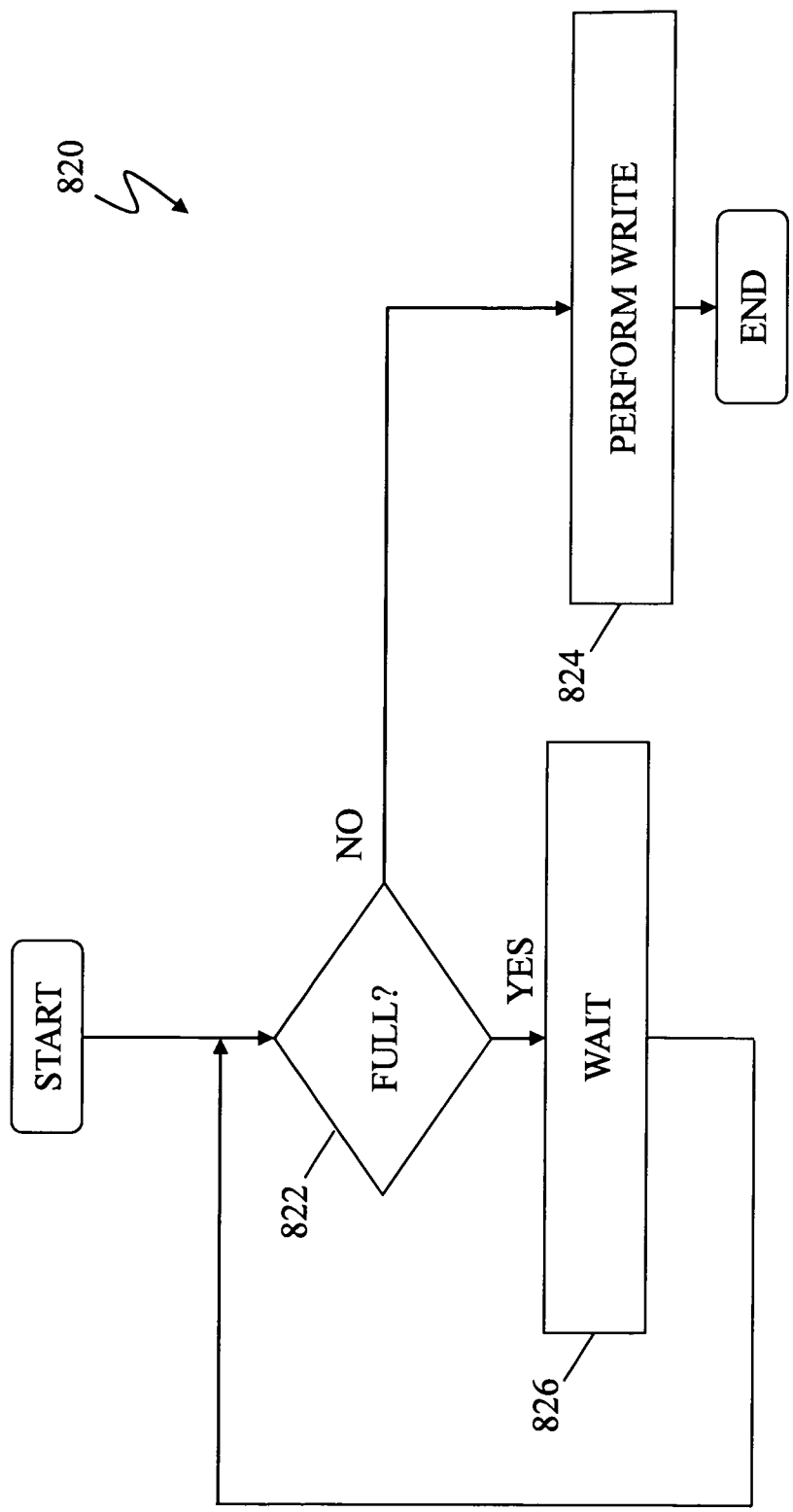
FIG. 13 is a flow chart of processes for writing data to a particular tier according to an embodiment of the system described herein.

FIG. 13 is a flow chart 820 illustrating steps performed in connection with writing data to a storage tier that may be full. Processing begins in the first test step 822 where it is determined if the storage tier is full. If not, then control passes from the test step 822 to a step 824 where the data is written to the storage tier. Following the step 824, processing is complete.

If it is determined at the test step 822 that the storage tier is full, then control passes from the test step 822 to a step 826 where wait processing is performed. The wait at the step 826 could be for any appropriate amount of time. Following the step 826, control passes back to the test step 822 for a new iteration.

Figure 14:
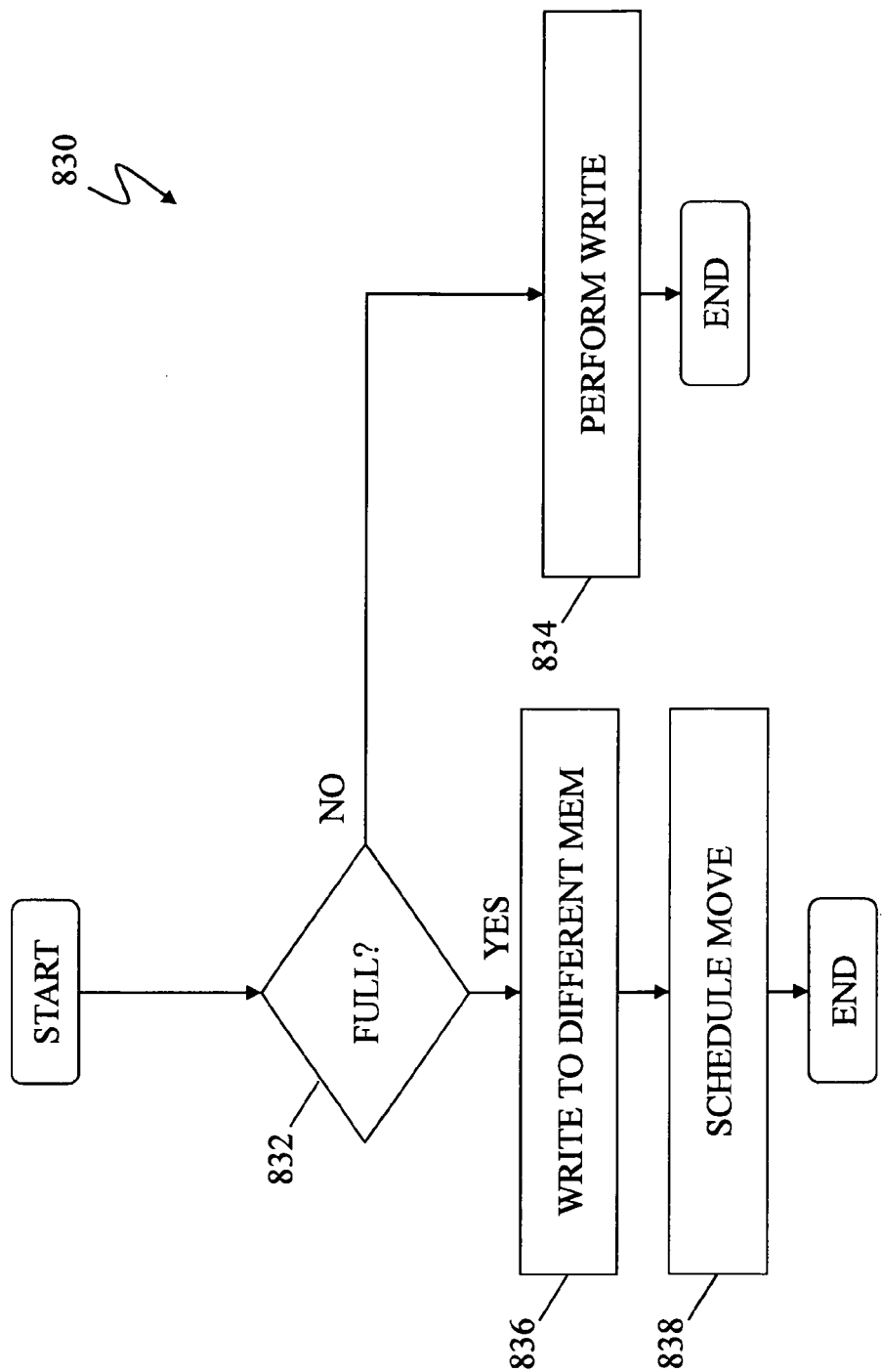
FIG. 14 is a flow chart of processes for writing data to a particular tier according to an alternative embodiment of the system described herein.

FIG. 14 is a flow chart 830 that illustrates an alternative embodiment for handling write operations to a storage tier that may be full. Processing begins at a first test step 832 where it is determined if the storage tier is full. If not, then control passes from the test step 832 to a step 834 where the data is written to the storage tier. Following the step 834, processing is complete.

If it is determined at the test step 832 that the storage tier is full, then control passes from the test step 832 to a step 836 where the data is written to a different storage area, such as a lower (or higher) storage tier or to global memory of the storage device (e.g., cache memory), as further discussed herein. The data may be placed in the different storage area temporarily. Following the step 836 is a step 838 where the data is scheduled to be moved to the appropriate storage area (the originally-destined storage tier). Following the step 838, processing is complete.

In an embodiment, at the step 836, the write data may be temporarily stored in a global memory, such as the global memory 46, until storage space in the particular requested tier becomes available that is sufficient to handle the write request. At the step 838, scheduling for the movement of the data may include relocating data in the particular requested tier, e.g. "faster" storage tier, to a lower tier, e.g. "slower" storage tier, to make memory available for the data temporarily stored in the global memory. In another embodiment, at the step 836, data for the requested write may be immediately written to a lower tier than that requested for the write and, at the step 838, a future promotion of the data to the particular requested higher tier (originally-destined storage tier) may be scheduled. The embodiments discussed herein provide for the dynamic re-allocation and re-ordering of data to accommodate write policies, usage patterns and the like.

Figure 15:
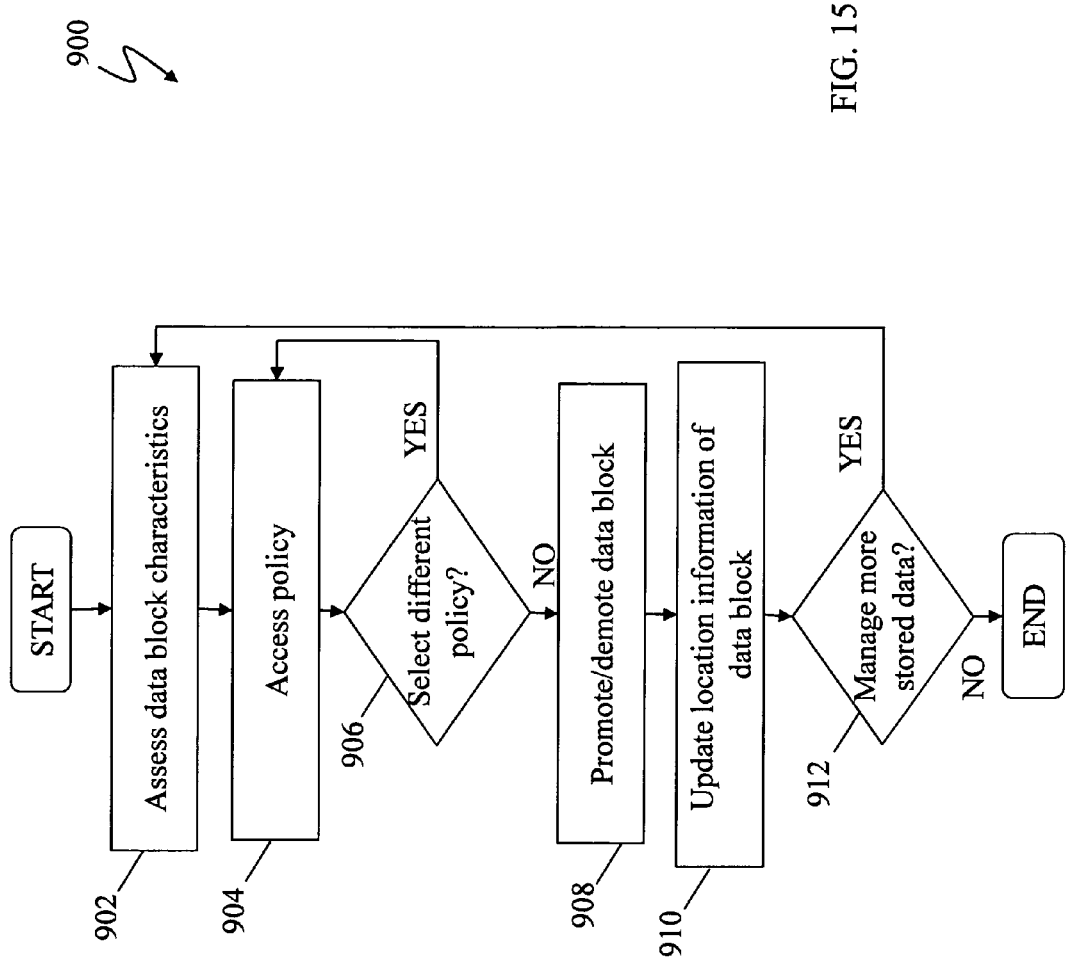
FIG. 15 is a flow chart of processes for promoting and demoting data blocks in a fine grained tiered storage system according to an embodiment of the system described herein.

FIG. 15 is a flow chart 900 of processes for promoting and demoting data blocks in a fine grained tiered storage system according to an embodiment of the system described herein. At a step 902, characteristics of a data block are assessed or otherwise determined. As further discussed elsewhere herein, characteristics may include access frequency of the data block, time of last access or use, information associated with particular users of the data block and/or other characteristics and statistics information. The characteristics may be assessed periodically, at a determined time, after the occurrence of a trigger event and/or based on some other criteria. After the step 902, processing proceeds to a step 904 where a policy is accessed related to promotion and/or demotion of data blocks between multiple storage tiers. Policies may be accessed automatically or manually as discussed elsewhere herein and include such policies as LRU, MFU, predictive policies and/or special purpose policies. After the step 904, processing proceeds to a test step 906 where it is determined if a different policy is to be selected. In some instances, it may be useful to be able to dynamically select the policy to be used based on characteristics of the data and/or some other criteria, such as dynamic run time conditions. For example, a first policy may be used for tier 4 data that was recently moved from tier 3 while a second policy may be used for tier 4 data that has been tier 4 data for a relatively long period of time. If a different policy is to be selected, processing proceeds back to the step 904. Otherwise, processing proceeds to a step 908.

At the step 908, data blocks are to be promoted and/or demoted according to the one or more policies. If a data block is promoted, the data block is moved to a storage area (device) in a pool of storage of a higher storage tier, for example faster storage. If a data block is to be demoted, the data block is moved to a storage area (device) in a pool of storage of a lower storage tier, for example slower storage. As further discussed elsewhere herein, in some cases, the promotion and/or demotion procedure may include moving copies of data blocks to other storage tiers and the deleting the old data blocks from their original storage location and/or copies of data blocks previously stored at the subsequent storage tiers may be used and "movement" of the data block is to make the previously-stored version of the data block become again the current, accessible data block.

After the step 908, processing proceeds to a step 910 where information concerning the location of the data block is updated in a table of information in the thin device, as further discussed elsewhere herein. After the step 910, processing proceeds to a test step 912 where it is determined whether additional stored data is to be managed according to the system described herein. If more stored data is to be managed (promoted/demoted), processing proceeds back to the step 902. Otherwise, processing is complete. Note that data access may be guaranteed even while data is being moved from one tier to another.

In principal, the advantages of a multi-tiered configuration increase as the size of the storage portions for which optimal tier selection are performed decreases. However, the use of smaller portions may result in the need to determine optimal placement for a significant number (e.g., billions) of regions. Thus, there are challenges presented in connection with scaling a tiering system for a relatively large storage area. In the system described herein, the overall process of optimizing tier usage is divided into a movement policy determination operation and an operation that applies the movement policy (moves the storage regions to the optimal tier for that region per the movement policy), in such a way that the movement policy determination operation can, if desired, be executed on processing hardware separate from that used by the movement policy application operation. For example, in some embodiments, the movement policy application operation may execute on a storage array containing the data and the movement policy determination operation may execute on a processing complex that is separate from the storage array, so that the movement policy determination operation can take advantage of larger processing and/or memory capacity than is available on the storage array. The system described herein provides that the movement policy may specify the preferred tier for a region of storage as a (statically defined) function of the host access rate (or other metrics) for the storage region. This allows a given instance of the movement policy to have longer useful life than a movement policy that specifies the preferred tier of a region of storage simply as a function of the logical address of the region since, with the system described herein, the preferred tier for a given region can change as a result of a change in the host access rate (or other metrics) for the region, even without a change to the movement policy. Furthermore, such a movement policy enables embodiments in which the movement policy determination operation can be performed without needing an input indicating which tier a given storage region is currently mapped to. Note that the movement policy determination and movement policy application operations may in turn be implemented in a distributed fashion in a given embodiment and, as will be discussed herein, may be optimized to minimize execution time and to minimize the adverse impacts of storage movement on storage system performance.

As discussed elsewhere herein, policies may be used to determine when to promote data (map the data to a relatively faster tier) and when to demote data (map the data to a relatively slower tier). In an embodiment herein, this may be performed by first determining a score for different portions of a storage space based on relative activity level and then constructing promotion and demotion histograms based on the different scores and the frequency of each. The policy may then be applied to each of the histograms to determine which data is promoted and which data is demoted. This is explained in more detail below.

In an embodiment herein, each of the storage portions may correspond to an extent, where each extent corresponds to forty-eight sub-extents, and each sub-extent corresponds to ten chunks and each chunk corresponds to twelve tracks, so that an extent includes four hundred and eighty chunks (five thousand seven hundred and sixty tracks). Note also that, for the same logical device, different ones of the extents may have different sizes. Note also that the storage space may be one or more of a single logical device, a group of logical devices, all logical devices corresponding to particular physical space, logical devices corresponding to a particular application or set of application, etc.

Figure 16:
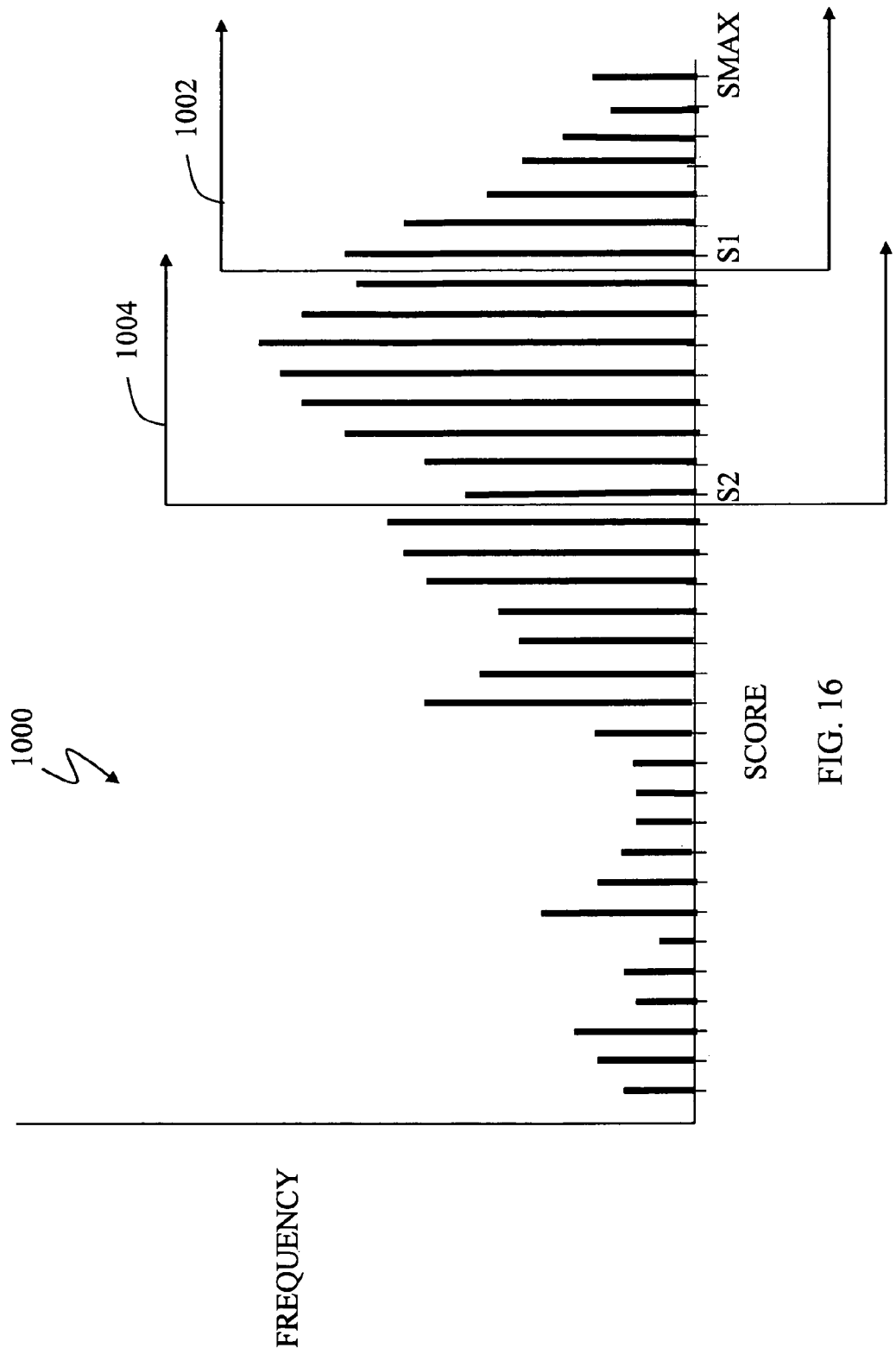
FIG. 16 is a histogram illustrating scoring data storage sections for promotion to higher tiers according to an embodiment of the system described herein.

Referring to FIG. 16, a histogram 1000 illustrates a plurality of activity bins (buckets) and the frequency thereof. Each vertical line of the histogram 1000 represents a bin corresponding to a number of storage portions (e.g., extents) having the corresponding score. Determination of a score for a storage portion is discussed in more detail elsewhere herein. In an embodiment herein, there are five thousand bins. Of course, a different number of bins may be used instead.

The height of each bin represents a number (frequency) of storage portions having a particular score. Thus, the longer a particular vertical line, the more storage portions there are having the corresponding score. Note that the sum of all of the frequencies of the histogram equals the total number of storage portions being considered for promotion in the particular iteration. Note also that the sum of frequencies of a portion between a first score and a second score equals the total number of storage portions having a score between the first and second scores.

The histogram 1000 also shows a first range indicator 1002 and a second range indicator 1004. The first range indicator 1002 corresponds to bins having a score from S1 to SMAX (the maximum score). The second range indicator 1004 corresponds to bins having a score of S2 to S1-1. In an embodiment herein, there are three levels of physical storage and storage portions having a score corresponding to the first range indicator 1002 are promoted (mapped) to a highest (fastest) level of storage and storage portions having a score corresponding to the second range indicator 1004 are promoted (mapped) to a medium level of storage. The remainder of the portions (i.e., that do not correspond to either the first range indicator 1002 or the second range indicator 1004) are not changed (are not promoted based on the histogram 1000). Of course, it is possible to have any number of storage levels.

In an embodiment herein, it may be possible to inhibit thrashing by only promoting a certain percentage of data that is above a particular threshold (e.g., promote the top 95% of data above the threshold) while leaving the remaining 5% of the data at its current tier. The remaining 5% may still be processed as if it had been promoted (e.g., not considered for demotion in certain cases, see discussion elsewhere herein).

Figure 17:
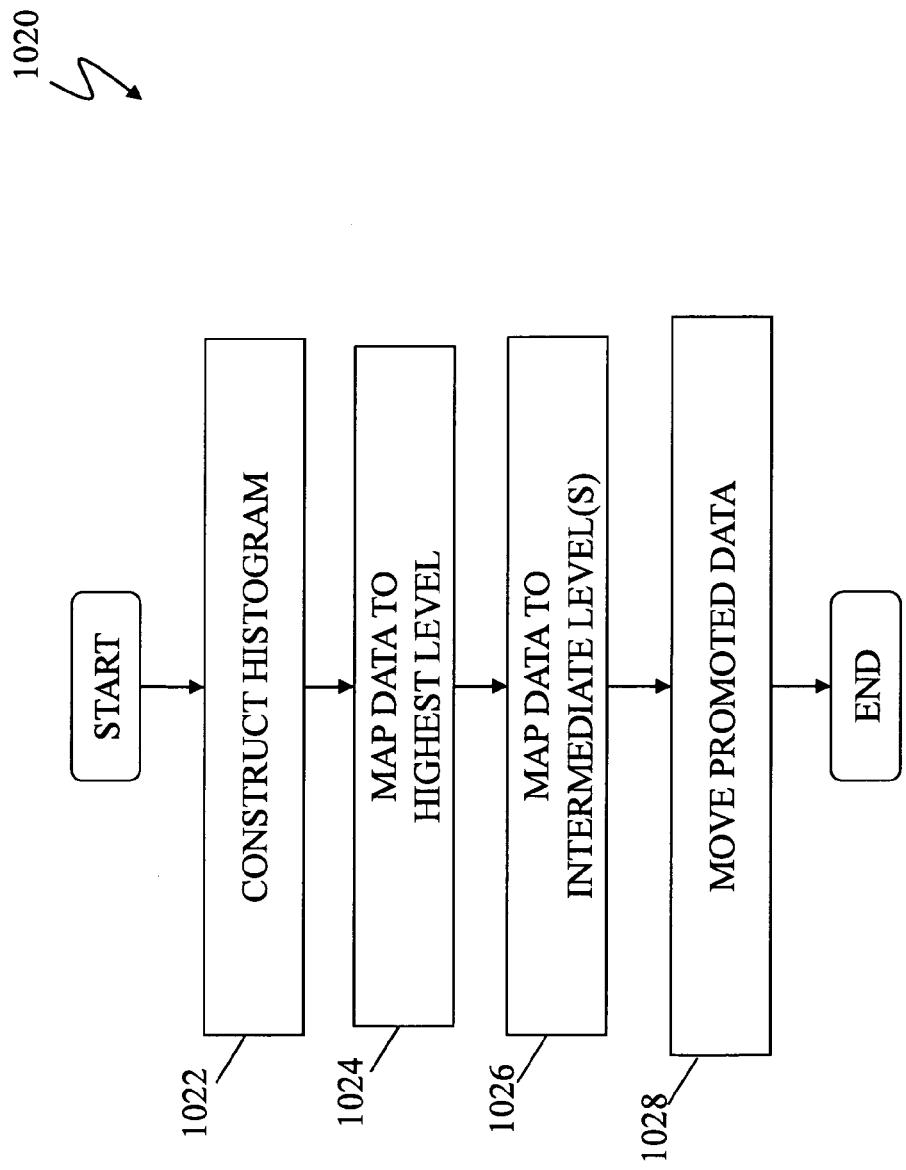
FIG. 17 is a flow chart illustrating mapping data to different tiers according to an embodiment of the system described herein.

Referring to FIG. 17, a flow chart 1020 illustrates steps performed in connection with promoting (mapping) storage portions to various levels. Processing begins at a first step 1022 where a histogram is constructed like the histogram 1000, discussed above. Scoring the storage portions to construct the histogram is discussed in more detail elsewhere herein. Following the step 1022 is a step 1024 where storage portions are promoted to a highest level of storage using the histogram constructed at the step 1022. The specific processing provided at the step 1024 varies according to the specific policy that is used. However, generally, it is possible to select up to a specific number of storage portions having a highest score where the specific number is based on the policy (e.g., 85% of available space at a particular level). Processing provided at the step 1024 is described in more detail elsewhere herein. Other policies may include a particular percentage of all space used for the storage space, data having a particular score (possibly up to some limit of the amount of data), etc.

Following the step 1024 is a step 1026 where storage portions are promoted to intermediate level(s) of storage in a manner similar to promoting to the highest level of storage (described elsewhere herein). Following the step 1026 is a step 1028 where data is moved (if necessary) to an assigned level of storage in a manner described elsewhere herein. Following the step 1028, processing is complete. Note that any number of different levels of storage is possible. In an embodiment herein, there are three levels of storage: a lowest level using SATA storage technology, an intermediate level using Fibre Channel technology, and a highest level using flash drive technology.

Figure 18:
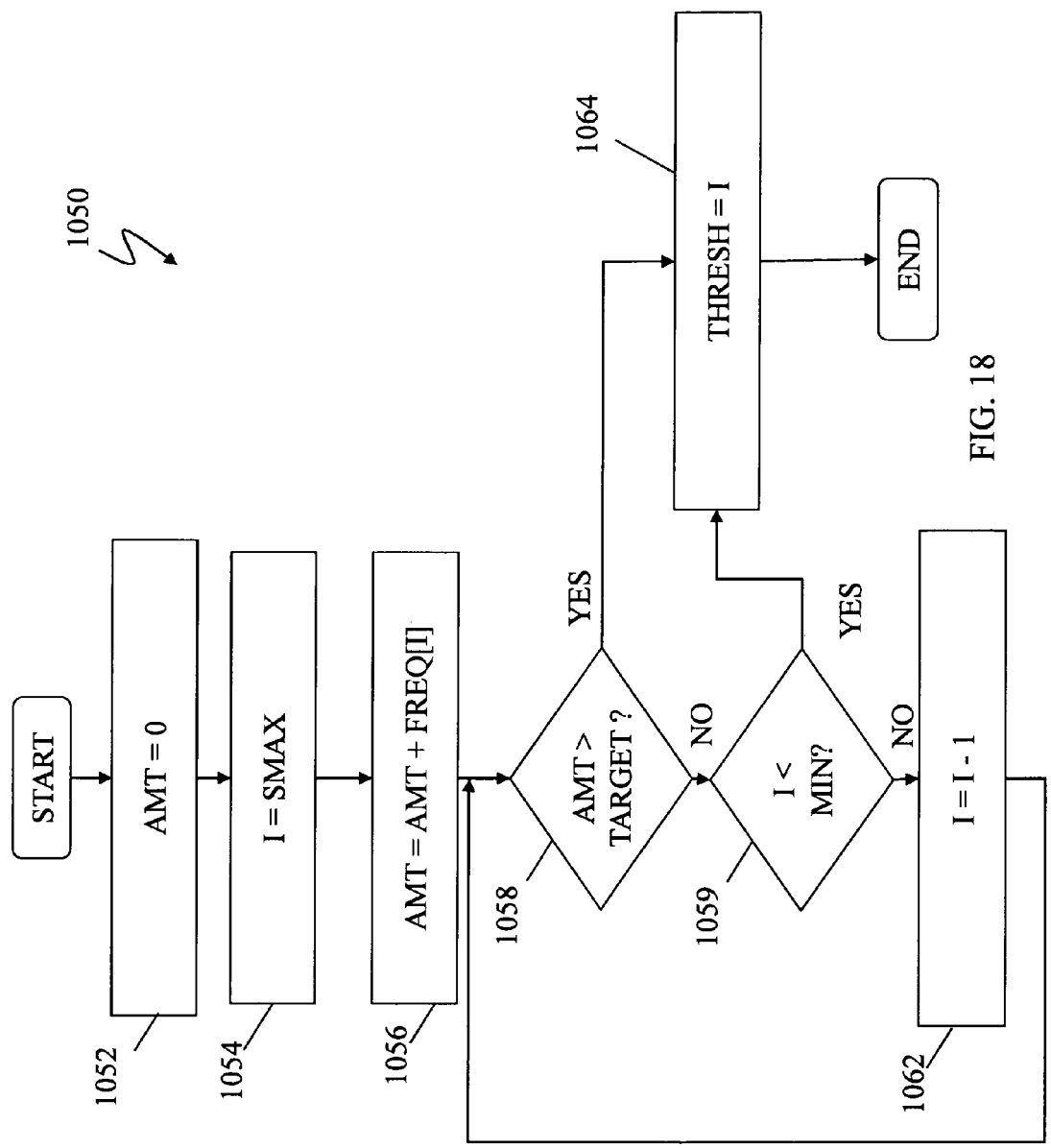
FIG. 18 is a flow chart illustrating accumulating storage sections for promoting to a different storage tier according to an embodiment of the system described herein.

Referring to FIG. 18, a flow chart 1050 illustrates in more detail processing performed in connection with the step 1024, described above. Processing begins at a first step 1052 where a variable that keeps track of the amount of storage portions, AMT, is initialized to zero. Following the step 1052 is a step 1054 where an index variable, I, is set equal to the maximum score (highest bin). In an embodiment herein, there are five thousand bins, so I would be set to five thousand at the step 1054. Of course, other numbers of bins are also possible.

Following the step 1054 is a step 1056 where AMT is incremented by FREQ[I], the amount of data mapped to bin I. Following the step 1056 is a test step 1058 where it is determined if AMT exceeds a target value set by a policy. In an embodiment herein, a policy may indicate a certain percentage of data to be assigned to a particular storage level (e.g., 85% of flash drive capacity). As discussed elsewhere herein, in other embodiments, the target value may be set according to different policies and/or different types of policies. In an embodiment herein, the target value represents an amount of data that can be compared to AMT at the step 1058.

If it is determined at the test step 1058 that AMT does not exceed the target value, then control passes from the test step 1058 to a test step 1059 where it is determined if I is less than a floor threshold (MIN). In some embodiments, a floor threshold may be set to prevent relatively inactive data (data with a relatively low score) from being promoted to a tier that is relatively high. That is, for each tier, a minimum value for I may be set so that data below that minimum is not promoted to that tier. If it is determined at the test step 1059 that I is not less than the floor threshold, MIN, then control passes from the test step 1059 to a step 1062 where the index variable, I, is decremented. Following the step 1062, control passes back to the step 1056 for another iteration. If it is determined at the test step 1058 that AMT does exceed the target value, or if it is determined at the test step 1059 that I is less than the floor value, MIN, then control passes to a step 1064 where a score threshold is set to the value of the index variable, I. Data portions having a score of I or higher are promoted to the highest level of storage. In other embodiments, only data portions having a score greater than I are promoted. Following the step 1064, processing is complete. Note, by the way, that it is possible in some instances for the physical capacity of a storage level to be exceeded, in which case the threshold may be set lower than otherwise indicated by the target. In other words, the test at the step 1058 may be modified to be (AMT>TARGET) OR (CAPACITY EXCEEDED).

Note that the test steps 1058, 1059 effectively set the threshold according to either the policy for a particular tier (e.g., fill up to fifty percent of capacity) or according to a value for I that will provide that data not promoted to a higher tier will still be serviced properly. For example, if a policy provides that the highest tier may be filled with up to fifty percent of its capacity, but most of the data of a particular storage group is rarely accessed (has relatively low scores), then the test at the step 1059 prevents data that is, rarely accessed from being promoted to the highest tier.

Note that the methodology for determining score values used to assign storage portions to one or more intermediate storage levels may be similar to that described above in connection with the flow chart 1050. In the case of intermediate storage levels though, the index variable I would be initialized to a score that is one less than the lowest score of the next highest storage level. For example, if storage portions having a score of 4500 to 5000 are assigned to the highest storage level, then the index variable, I, would be initialized to 4499 in connection with determining scores for an intermediate storage level just below the highest storage level.

Figure 19:
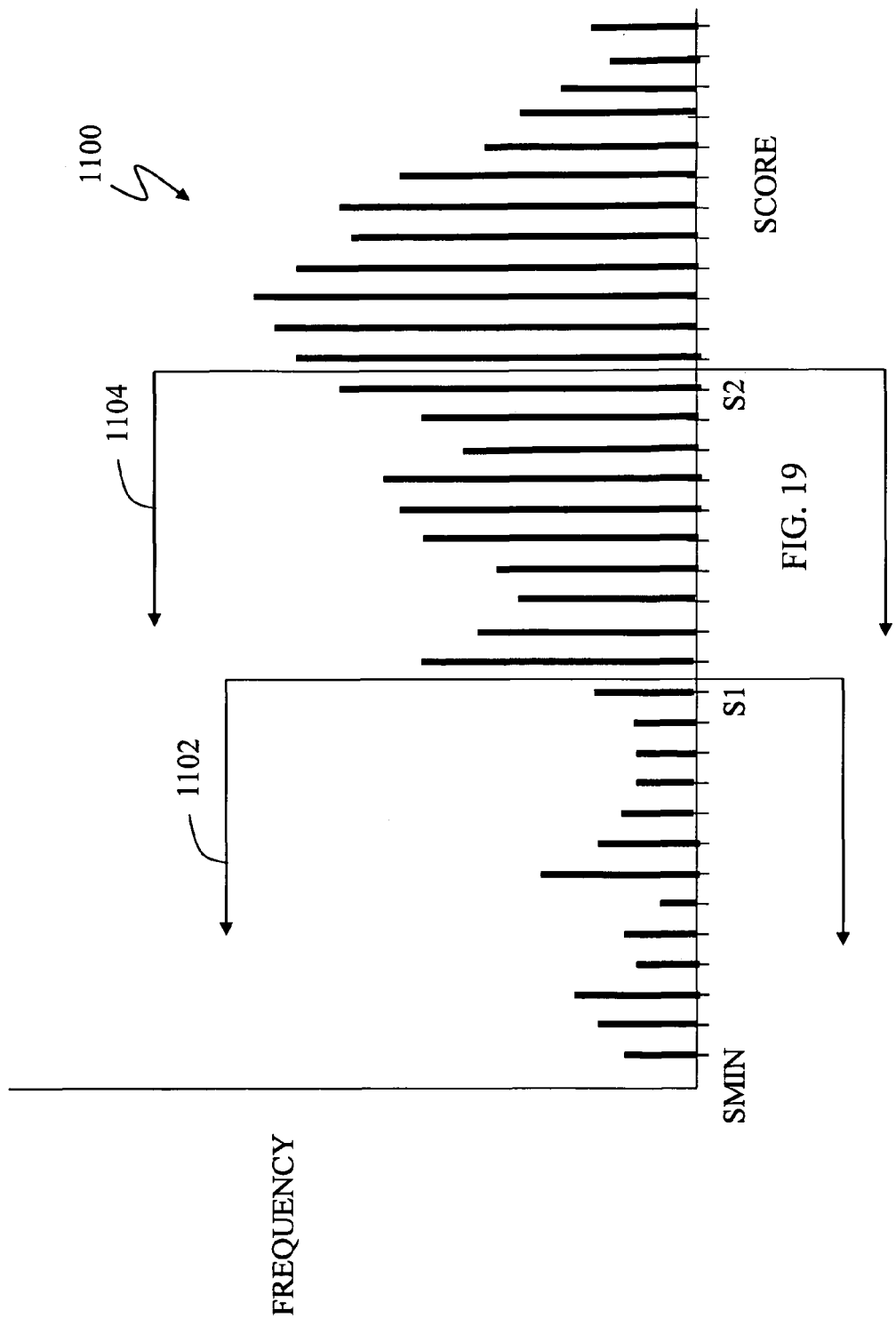
FIG. 19 is a histogram illustrating scoring data storage sections for demotion to lower tiers according to an embodiment of the system described herein.

Referring to FIG. 19, a histogram 1100 is like the histogram 1000, discussed above, and illustrates a plurality of scores and the frequency thereof. The histogram 1100 may be used to determine which of the storage portions (if any) are to be demoted (mapped to relatively slower physical storage). In some embodiments, the histogram 1100 may be identical to the histogram 1000. In other embodiments, the histogram 1100 may be different than the histogram 1000 because the scores for the histogram 1000 used for promotion may be different than the scores for the histogram 1100 used for demotion. Determination of promotion and demotion scores is discussed in more detail elsewhere herein.

The histogram 1100 also shows a first range indicator 1102 and a second range indicator 1104. The first range indicator 1102 corresponds to bins having a score from SMIN (the minimum score) to S1. The second range indicator 1104 corresponds to bins having a score of S1+1 to S2. In an embodiment herein, there are three levels of storage and storage portions having a score corresponding to the first range indicator 1102 are demoted (mapped) to a lowest (slowest) level of physical storage and storage portions having a score corresponding to the second range indicator 1104 are demoted (mapped) to a medium level of storage. The remainder of the portions (i.e., that do not correspond to either the first range indicator 1102 or the second range indicator 1104) are not changed (are not demoted based on the histogram 1100). Of course, it is possible to have any number of storage levels. Note that, as discussed elsewhere herein, in some embodiments storage portions that have been recently marked as promoting to a highest tier are not candidates for demotion and storage portions that have been recently been marked as promoting to a middle tier are not candidates for demotion to a lowest tier.

In an embodiment herein, the mechanism for demoting storage portions (extents) may be analogous to the mechanism for promoting storage portions. Some of the processing may be reversed so that, for example, the storage portions to be demoted to the lowest level of storage would be determined first and the index variable, I (from the flow chart 1050 of FIG. 18), would be initially set to SMIN and then incremented on each iteration.

In some embodiments, when a storage portion (e.g., an extent) is selected for promotion, only active sub-portions (e.g., sub-extents) are promoted while inactive sub-portions remain at their current storage level. In an embodiment herein, a sub-portion is considered active if it has been accessed in the previous 4½ days and is considered inactive otherwise. Of course, other appropriate criteria may be used to deem sub portions either active or inactive. In some embodiments, when a storage portion (e.g., an extent) is selected for demotion, the entire storage portion is demoted, irrespective of activity level of sub-portions. Note that it may be possible to promote some sub-extents of a super-extent and then demote the remaining sub-extents of the same super-extent since whether data is active or inactive may be determined on a sub-extent level. Note also that, in the particular embodiment illustrated herein, a past state (tier) of the data is not factored in to a decision to promote or demote data.

In some cases, it may be desirable to minimize the amount of data that is demoted. A mechanism for doing this may take into account the capacity and amount of data that has been placed onto the higher tiers and set the demotion threshold lower (so less data is demoted) if the amount of promoted data is less than the capacity (or specified percent of capacity) of the higher tiers. For example, if the policy indicates a desire to fill the higher tiers within fifty percent of capacity, but the promotion portion of the algorithm has only promoted data so that the higher tiers are thirty percent full, the demotion threshold may be set lower so that less data is demoted.

Figure 20:
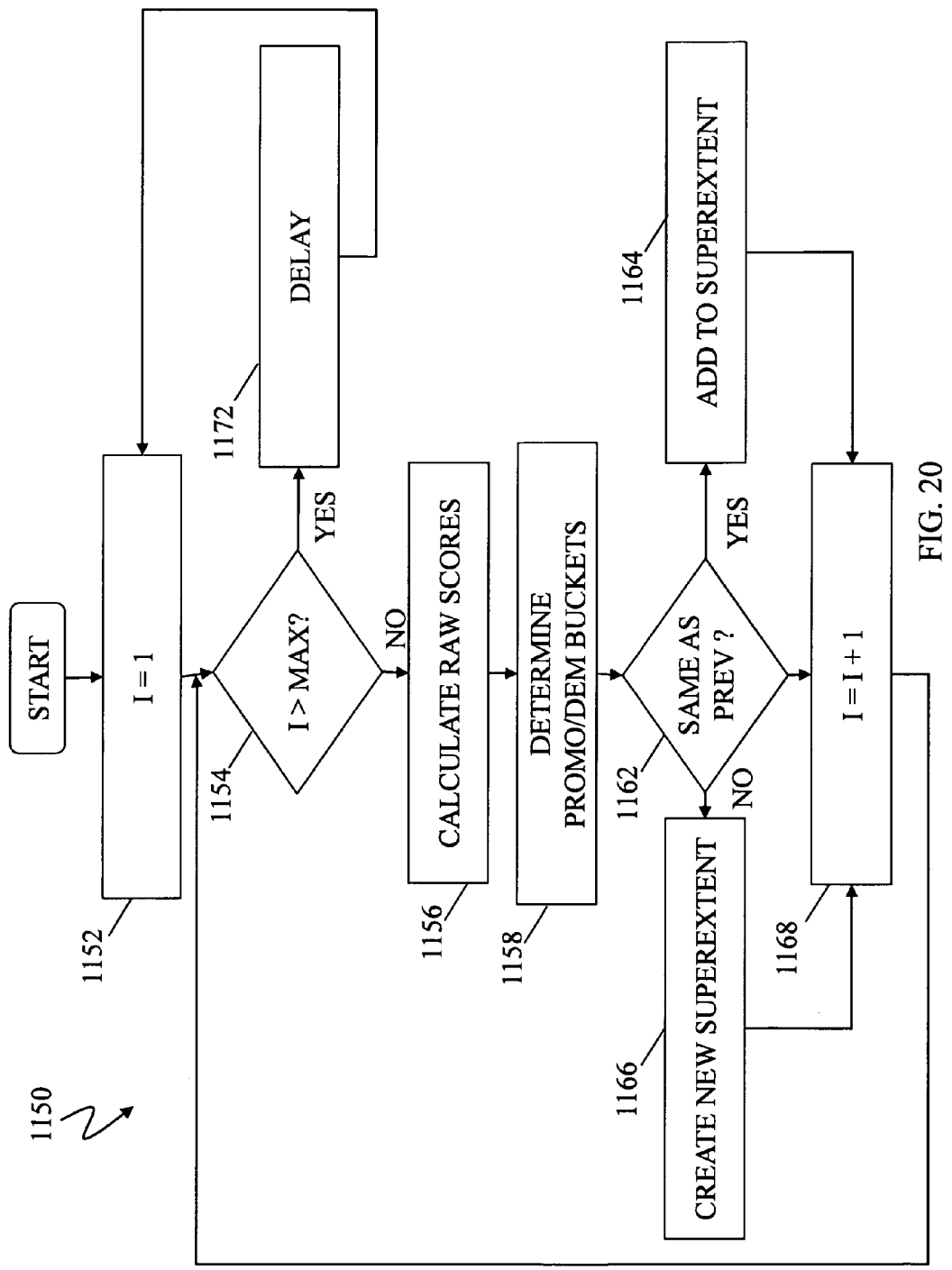
FIG. 20 is a flow chart illustrating processing performed in connection with creating histograms for promotion and demotion of data to different tiers of storage according to an embodiment of the system described herein.

Referring to FIG. 20, a flow chart 1150 illustrates steps performed in connection with creating the histograms 1000, 1100. Processing begins at a first step 1152 where an index variable, I, is set to one. The index variable I is used to iterate through the storage portions (e.g., extents) of a storage space. Following the step 1152 is a test step 1154 where it is determined if I is greater than MAX, a maximum value for I (e.g., the number of extents of the storage space). The test at the step 1154 determines if all of the storage portions of a particular storage space have been processed. If not, then control transfers from the test step 1154 to a step 1156 where the raw promotion score and the raw demotion scores are calculated.

The raw promotion score and the raw demotion score reflect an amount of I/O activity for a particular extent. Any appropriate mechanism may be used to calculate the scores. In an embodiment herein, the raw promotion score is provided by the formula:

$$(p1*s\_rrm+p2*s\_w+p3*sp+p4*l\_rrm+p5*l\_w+p6*l\_p)/(\# \text{ Active Subext}+1)$$

where s_rrm is the rate of short term random read misses, s_w is the rate of short term writes, s_p is the rate of short term pre-fetches, l_rrm is the rate of long term random read misses, l_w is the rate of long term writes, and l_p is the rate of long term pre-fetches for a given extent. The coefficients p1-p6 may be set as appropriate. In an embodiment herein, the values used may be 12, 4, 4, 3, 1, and 1, respectively. Of course, different values may be used to emphasize or deemphasize different I/O characteristics in connection with determination of the promotion raw score. In an embodiment herein, the different short term and long term rates my be provided using the mechanism described in U.S. patent Ser. No. 12/924,396 filed on Sep. 27, 2010 and titled "TECHNIQUES FOR STATISTICS COLLECTION IN CONNECTION WITH DATA STORAGE PERFORMANCE", which is incorporated by reference herein. Of course, any appropriate technique may be used for collection of the statistics used herein.

The demotion raw score may be determined using the following formula:

$$(p4*s\_rrm+p5*s\_w+p6*sp+p1*l\_rrm+p2*l\_w+p3*l\_p)$$

where s_rrm, s_w, p1, etc. are as set forth above.

Following the step 1156 is a step 1158 where the promotion bucket index and the demotion bucket index are both calculated. The indexes are used to add data to the histograms 1000, 1100. Determination of the bucket indexes is discussed in more detail elsewhere herein. In some embodiments, the promotion raw score may be multiplied by a priority factor (e.g., one, two, or three) prior to obtaining the bucket index. The priority factor may be used to give higher priority (i.e., increase the likelihood of promotion) for some of the storage, possibly selected by a user or by a policy. For example, important operations in an organization may be assigned a higher priority so that storage associated therewith is provided with a priority factor of two or three (or some other value).

Following the step 1158 is a test step 1162 where it is determined if the promotion and demotion bucket indices determined at the step 1158 are the same as the promotion and demotion indices determined for the most recent extent or set of extents. If so, then control passes from the test step 1162 to a step 1164 where the current extent being processed is added to a super-extent data element for the most recent extent or set of extents. The super-extent represents data for a number of contiguous extents having the same promotion and demotion indices. The super-extents are provided to increase efficiency and decrease the amount of storage needed. Note that other criteria may be used to combine information for contiguous extents.

If it is determined at the test step 1162 that the promotion and demotion bucket indices determined at the step 1158 are the same as the promotion and demotion indices determined for the most recent extent or set of extents, then control passes from the test step 1162 to a step 1166 where a new super-extent is created. Adding to an existing super-extent at the step 1164 and creating a new super-extent at the step 1166 are both discussed in more detail elsewhere herein. Following the step 1164 and following the step 1166 is a step 1168 where the index variable, I, is incremented. Following the step 1168, control transfers back to the test step 1154 for another iteration.

If it is determined at the test step 1154 that I, the index variable used to iterate through the storage portions (e.g., extents), is greater than a maximum value (the number of extents being processed), then control transfers from the test step 1154 to a step 1172 where a delay is introduced. Following the step 1172, control transfers back to the step 1152 to reprocess the extents of a data storage space to reconstruct the histograms 1000, 1100.

The amount of delay at the step 1172 represents the cycle time for repeatedly reconstructing the histograms 1000, 1100. The delay may be a constant and/or may be adjustable depending upon the amount of time spent performing other processing associated with promotion and demotion of data. In some embodiments, the delay may be set so that the histograms are recalculated every ten minutes. It is also possible to keep track of instances where the algorithm does not complete in a certain amount of time (e.g., ten minutes). In such a case, a counter could be incremented each time the algorithm does not complete and decremented when it does. If the counter reaches a certain value (e.g., ten), the system may operate in a degraded mode indicating that data tiering is not being performed properly.

Figure 21:
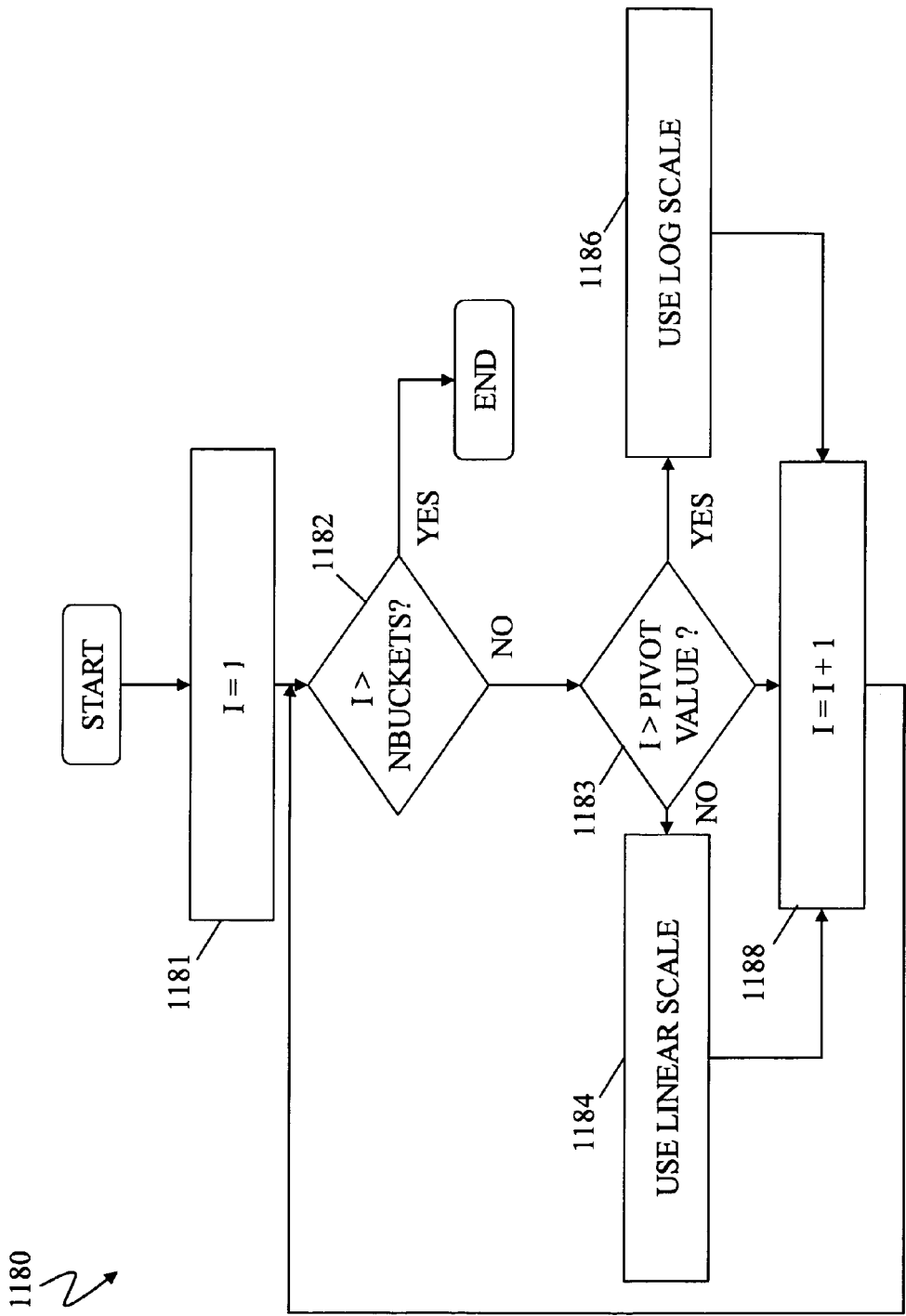
FIG. 21 is a flow chart illustrating processing performed in connection with determining lower boundary values to facilitate mapping raw scores into histogram buckets according to an embodiment of the system described herein.

Referring to FIG. 21, a flow chart 1180 illustrates steps performed in connection with providing values for converting the raw promotion and demotion scores into promotion and demotion indices (buckets). In an embodiment herein, each of the buckets (bins) has a lower boundary of a raw score that falls into a particular bucket. Thus, for example, given a bucket I, a raw score will map to bucket I if the raw score has a value between the lower boundary of bucket I and one less than the lower boundary of bucket I+1. The following describes how the lower boundary values are set for the bins and thus describes how to map raw scores to particular histogram buckets (bins). Accordingly, the processing performed at the step 1158, discussed above, where raw scores are mapped into particular buckets involves finding a particular bucket where the raw score falls between the low boundary thereof and the lower boundary of the next bucket.

Processing begins at a first step 1181 where I, an index variable, is set to one. The index variable, I, is used to iterate through all of the buckets (bins). Following the step 1181 is a test step 1182 where it is determined if I is greater than NBUCKETS, the number of buckets (histogram values) used by the system. In an embodiment herein, NBUCKETS is five thousand, although other values may be used. If it is determined at the step 1182 that I exceeds the number of buckets, then process is complete. Otherwise, control transfers from the step 1182 to test step 1183 where it is determined if I is greater than a pivot value. In an embodiment herein, a linear scale is used for setting a lower boundary for buckets below the pivot value and a logarithmic scale is used for setting the lower boundary for buckets above the pivot value. Determination of the pivot value is discussed in more detail elsewhere herein.

If it is determined at the test step 1183 that I is not greater than the pivot value, then control passes from the test step 1183 to a step 1184 where a linear scale is used for setting the lower boundary of bucket I. In an embodiment herein, the lower boundary is set equal to I (the bucket number) at the step 1184, but of course other mappings are possible. If it is determined at the test step 1183 that I is greater than the pivot value, then control passes from the test step 1183 to a step 1186 where a logarithmic mapping is used. In an embodiment herein, the following formula is used:

lower boundary=exp(log(pivot value)+logperbucket*(I−pivot value))

where logperbucket equals (maxlog−minlog)/(numbuckets−pivot value−2), maxlog=log(max raw score), minlog=log (pivot value), and numbuckets is the total number of buckets. In an embodiment herein, numbuckets is five thousand and max raw score is 4,800,000. Of course, other values may be used.

Following the step 1184 or the step 1186 is a step 1188 where I is incremented. Following the step 1188, control transfers back to the step 1182 for another iteration.

As discussed elsewhere herein, determining the low boundary for each of the buckets allows mapping the raw scores into particular buckets at the step 1158, discussed above. A raw score maps to a particular bucket when the raw score is greater than or equal to the low boundary and when the raw score is less than the lower boundary of the next higher bucket. The processing illustrated by the flow chart 1180 constructs a table used to map raw promotion and demotion scores into buckets. The mapping may be performed using a binary search of the table.

Figures 22, 23:
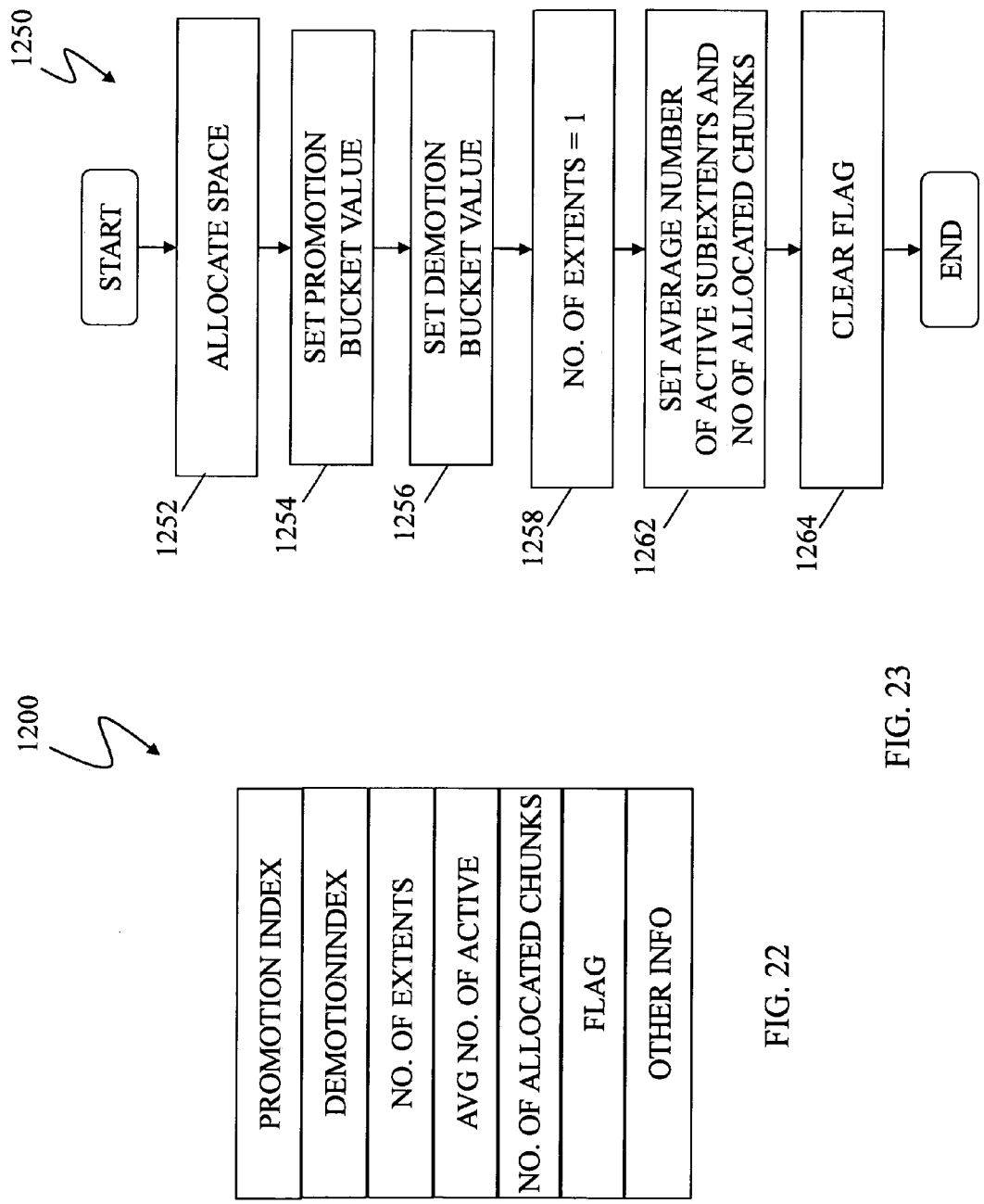
FIG. 22 is a diagram illustrating a data structure used for storing data for super-extents according to an embodiment of the system described herein.
FIG. 23 is a flow chart illustrating processing performed in connection with creating a new super-extent according to an embodiment of the system described herein.

Referring to FIG. 22, a diagram 1200 illustrates a data structure that may be used for storing metadata for a super-extent. The data structure 1200 includes an entry for the promotion bucket index for the super-extent and an entry for the demotion bucket index for the super-extent. The data structure 1200 also includes an entry for the number of extents in the super-extent.

As discussed elsewhere herein, an extent may include a number of sub-extents. In an embodiment herein, there are forty-eight sub-extents for each extent. Some of the sub-extents may be active (i.e., have been accessed within a particular amount of time). In an embodiment herein, a sub-extent is considered active if there has been at least one I/O operation thereon within the last 4½ days and is considered inactive otherwise. The data structure 1200 includes a field indicating the average number of active sub-extents for all of the extents of the super-extent. The value of the average number of active sub-extents field is provided by:

(total number of active sub-extents)/(number of extents)

The data structure 1200 also includes a flag field that indicates whether data for a particular super-extent was recently promoted or demoted and to which tier. In some embodiments, it is possible to use the flag field to decide to add a particular super-extent to a histogram and/or whether to demote (or promote) data corresponding to a particular super-extent. For example, in an embodiment herein, data that had been recently promoted to the first or second highest level (according to the flag field) is not considered for demotion to the lowest level and data that been recently promoted to the highest level (according to the flag field) is not considered for demotion at all. Note that handling promotion first followed by demotion may be considered part of the policy. The data structure 1200 may also include other information. In an embodiment herein, the flag indicates whether a corresponding data portion had been promoted or demoted in connection with the previous histogram (e.g., the most recent iteration). Thus, after running the promotion algorithm, the flag may be used to eliminate from the demotion histogram any data that had just been promoted, as described above.

Referring to FIG. 23, a flow chart 1250 illustrates steps performed in connection with creating a new super-extent at the step 1166, described above. Processing begins at a first step 1252 where space is allocated for the metadata for the super-extent. In an embodiment herein, the super-extent metadata may be provided in the global memory 46, although other storage locations are possible, provided that the metadata is accessible to provide the processing described herein.

Following the step 1252 is a step 1254 where the promotion bucket index is set to the value determined at the step 1158, described above. Following the step 1254 is a step 1256 where the demotion bucket index is set. Following the step 1256 is a step 1258 where the number of extents field is set to one. Following the step 1258 is a step 1262 where the value for the average number of active sub-extents field is set according to the number of active sub-extents for the extent and where the number of allocated chunks for the super-extent is set. Following the step 1262 is a step 1264 where the flag field is initialized (e.g., cleared) because the data corresponding to the new super-extent had not been recently promoted or demoted (i.e., marked, according to the flag, as having been promoted or demoted in the previous operation). Following the step 1264, processing is complete.

Figures 24, 25:
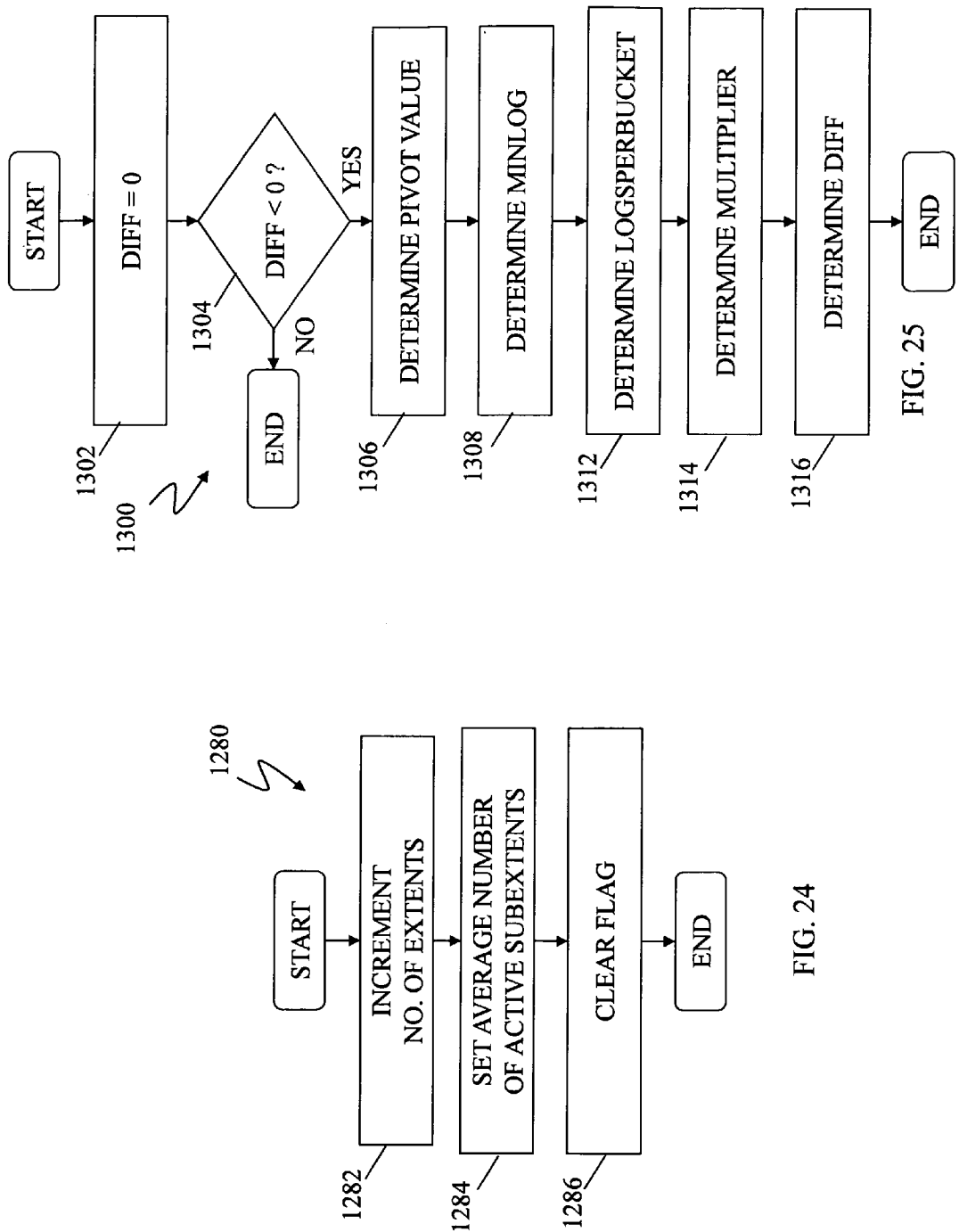
FIG. 24 is a flow chart illustrating processing performed in connection with adding extent information to a super-extent according to an embodiment of the system described herein.
FIG. 25 is a flow chart illustrating calculating a pivot value according to an embodiment of the system described herein.

Referring to FIG. 24, a flow chart 1280 illustrates steps performed in connection with adding an extent to an existing super-extent at the step 1164, described above. Processing begins at a first step 1282 where the number of extents field is incremented.

Following the step 1282 is a step 1284 where the average number of active sub-extents field is adjusted to account for the active sub-extents in the extent being added. Following the step 1284 is a step 1286 where the flag field is modified (e.g., cleared). Following the step 1286, processing is complete.

Referring to FIG. 25, a flow chart 1300 illustrates steps performed in connection with determining the pivot value. As described elsewhere herein, the pivot value is used to determine when to use a linear scale to set the lower boundary for a bucket index and when to use a log scale to set the lower boundary. It is desirable to set the pivot value so that the log scale does not cause the same lower boundary value to be provided for adjacent buckets. In an embodiment herein, the pivot value is set so that the difference between adjacent lower boundary values is at least one, but a different value for the desired difference may also be used.

Processing for the flow chart 1300 begins at a first step 1302 where a variable, DIFF, is set to zero. The DIFF variable is used to keep track of the difference between the lower boundaries of adjacent buckets as the pivot value is increased. Following the step 1302 is a test step 1304 where it is determined if DIFF is less than one. If not, then processing is complete. Otherwise, control transfers from the test step 1304 to a step 1306 where the pivot value is calculated using the formula:

pivot value=1+1/(multiplier−1)

where multiplier equals exp (logsperbucket) and where determination of logsperbucket is described above. For the initial determination of logsperbucket prior to first performing the step 1306, it is assumed that pivot value is one so that the initial value of minlog is zero.

Following the step 1306 is a step 1308 where minlog is recalculated. As discussed elsewhere herein, minlog is the log of the pivot value. Following the step 1308 is a step 1312 where logsperbucket is recalculated. Determination of logsperbucket is discussed elsewhere herein. Following the step 1312 is a step 1314 where multiplier (which equals exp (logsperbucket)) is recalculated. Following the step 1314 is a step 1316 where DIFF is recalculated using the formula:

DIFF=(pivot value)*multiplier−pivot value

Following the step 1316, control transfers back to the step 1304 for another iteration.

In some embodiments, it is possible to have multiple independent storage groups that share the same physical storage space, where each storage group has its own independent set of thresholds used for tiering data. Note also that, since it is not necessary to provide absolute comparison of statistics of all of the data stored in physical storage space, the system could be implemented with multiple independent processes (possibly executed by different processors) that determine histograms and provide tiering for different storage groups. Constructions of the histograms 1000, 1100 may be independent of each other and may be independent of processing that uses the histograms to promote and demote data.

Although the system has been described herein in connection with thin devices, it should be appreciated by one of ordinary skill in the art that the system may be applied to any type of logical device, including thick devices, VLUN technology, and/or any other type of storage device. In an embodiment herein, it is possible to have multiple storage groups where each storage group provides its own demand for different levels of storage. Although the system has been illustrated herein with different tiers representing different relative storage speeds, tiers may be generally understood to represent different classes of storage that may be differentiated by one or more of the characteristics, such as physical location, dependability, reliability, security, cost, etc.

The above-noted steps, and other steps described herein, may be performed automatically by the system described herein. For example, steps described herein may be performed periodically, at designated times, and/or after particular trigger events, such as receipt of a write request, access by a particular user to the system (log in and/or log out), after assessment of space usage on the disk drives (for example, space usage on the fast disk drive) and/or after some other suitable I/O action. Alternatively, the steps described herein may be activated manually by a user and/or a system administrator. In an embodiment, the system described herein may include a system having at least one processor that performs any of the above-noted steps. The ordering of the steps may be changes in certain instances, as appropriate. Further, computer software, stored in a computer-readable medium (non-transitory computer-readable medium), may be provided according to the system described herein including executable code for carrying out any of the steps and processes described herein.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for identifying data for placement in a storage system having a plurality of storage classes, comprising:
  subdividing the data into portions;
  determining at least one score for each portion based on a metric corresponding to access of a respective portion, wherein the at least one score for each portion is independent of scores for other ones of the portions;
  grouping different contiguous sets of portions into super-portions by combining a portion with a contiguous super-portion in response to the portion and the super-portion having similar scores or by creating a new super-portion, wherein each of the super-portions is optionally adjusted in subsequent iterations to remove existing portions or add new portions based on subsequent determination of similarity of scores for the portions and wherein combining a first portion with a first super-portion having a first score and a second portion with a second super-portion having a second score is independent of any difference between the first score and the second score;

independently from grouping different contiguous sets of portions into super-portions, identifying sub-portions of data for placement in a first storage class based on the at least one score of a super-portion of data corresponding to the sub-portions; and determining an active component of at least one portion included in the identified sub-portions, wherein the active component is identified for placement in the first storage class, and another component of the at least one portion is identified for placement in a second storage class that is different from the first storage class.

2. A method, according to claim 1, wherein the at least one score is based on access statistics.

3. A method, according to claim 2, wherein the access statistics include read misses, writes, and prefetches.

4. A method, according to claim 2, wherein placement of data includes promotion of sub-portions of data to relatively faster storage classes and demotion of sub-portions of data to relatively slower storage classes and wherein a first score that emphasizes a first portion of the access statistics is used for promotion and wherein a second score that emphasizes a second portion of the access statistics is used for demotion.

5. A method, according to claim 4, wherein a sub-portion of data marked for promoting based on a score thereof is not considered for demotion for a time interval based on a policy.

6. A method, according to claim 4, wherein there are three storage classes of data and wherein a sub-portion of data marked for promoting to a fastest class of storage is not considered for demotion and wherein sub-portion of data marked for promoting to a second fastest class of storage is not considered for demotion to a slowest class of storage.

7. A method, according to claim 1, wherein placement of sub-portions of data includes promotion of sub-portions of data to relatively faster storage classes and demotion of sub-portions of data to relatively slower storage classes.

8. A method, according to claim 1, wherein the portions of data are extents having five thousand seven hundred and sixty tracks of data.

9. A method, according to claim 8, wherein the sub-portions of data are one or more data chunks of a corresponding portion and wherein each of the data chunks has one hundred and twenty tracks of data.

10. Computer software, provided in a non-transitory computer-readable medium, that identifies data for placement in a storage system having a plurality of storage classes, the software comprising:

executable code that determines at least one score for each portion of the data based on a metric corresponding to access of a respective portion, wherein the at least one score for each portion of the data is independent of scores for other portions of the data;

executable code that groups different contiguous sets of portions by combining a portion with a contiguous super-portion in response to the portion and the super-portion having similar scores or by creating a new super-portion, wherein each of the super-portions is optionally adjusted in subsequent iterations to remove existing portions or add new portions based on subsequent determination of similarity of scores for the portions and wherein combining a first portion with a first super-portion having a first score and a second portion with a second super-portion having a second score is independent of any difference between the first score and the second score;

executable code that, independently from grouping different contiguous sets of portions into super-portions, identifies sub-portions of data for placement in a first storage class based on the at least one score of a portion of data corresponding to the sub-portions; and executable code that determines an active component of at least one portion included in the identified sub-portions, wherein the active component is identified for placement in the first storage class, and another component of the at least one portion is identified for placement in a second storage class that is different from the first storage class.

11. Computer software, according to claim 10, wherein the at least one score is based on access statistics.

12. Computer software, according to claim 11, wherein the access statistics include read misses, writes, and prefetches.

13. Computer software, according to claim 11, wherein executable code that places the data includes executable code that promotes sub-portions of data to relatively faster storage classes and demotes sub-portions of data to relatively slower storage classes and wherein a first score that emphasizes a first portion of the access statistics is used for promotion and wherein a second score that emphasizes a second portion of the access statistics is used for demotion.

14. Computer software, according to claim 13, wherein a sub-portion of data marked for promoting based on a score thereof is not considered for demotion for a time interval based on a policy.

15. Computer software, according to claim 13, wherein there are three storage classes of data and wherein a sub-portion of data marked for promoting to a fastest class of storage is not considered for demotion and wherein sub-portion of data marked for promoting to a second fastest class of storage is not considered for demotion to a slowest class of storage.

16. Computer software, according to claim 10, wherein executable code that places sub-portions of data includes executable code that promotes sub-portions of data to relatively faster storage classes and demotes sub-portions of data to relatively slower storage classes.

17. Computer software, according to claim 10, wherein the portions of data are extents having five thousand seven hundred and sixty tracks of data.

18. Computer software, according to claim 17, wherein the sub-portions of data are one or more data chunks of a corresponding portion and wherein each of the data chunks has one hundred and twenty tracks of data.

19. Computer software according to claim 10, wherein at least some of the scores are logarithmic.

20. A method according to claim 1, wherein at least some of the scores are logarithmic.

21. Computer software according to claim 10, wherein at least some of the scores for the portions are based on a non-linear scale.

22. Computer software according to claim 10, wherein the data distribution representation includes a histogram having a horizontal scale corresponding to a score value and a vertical scale corresponding to a number of data portions having a particular value.

23. A method according to claim 1, wherein at least some of the scores for the portions are based on a non-linear scale.

24. A method according to claim 1, wherein the data distribution representation includes a histogram having a horizontal scale corresponding to a score value and a vertical scale corresponding to a number of data portions having a particular value.

* * * * *